(12) United States Patent
Huyse

(10) Patent No.: US 8,483,993 B2
(45) Date of Patent: Jul. 9, 2013

(54) ACCURATELY ACCOUNTING FOR SIZING UNCERTAINTY IN INSPECTION

(75) Inventor: Luc Huyse, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 233 days.

(21) Appl. No.: 12/902,459

(22) Filed: Oct. 12, 2010

(65) Prior Publication Data
US 2012/0089366 A1 Apr. 12, 2012

(51) Int. Cl.
*G06F 17/18* (2006.01)
*G06F 19/00* (2011.01)
*G01B 11/02* (2006.01)

(52) U.S. Cl.
USPC ............................ 702/170; 702/179; 702/181

(58) Field of Classification Search
USPC ................. 702/170, 179, 181; 382/149, 156, 382/224; 73/618, 619; 707/2, 6, 100, 101, 707/200; 706/1, 15, 25
See application file for complete search history.

(56) References Cited

U.S. PATENT DOCUMENTS

| | | | |
|---|---|---|---|
| 2002/0097045 A1 | 7/2002 | Crouzen et al. | |
| 2003/0023404 A1 | 1/2003 | Moselhi et al. | |
| 2005/0182613 A1 | 8/2005 | Kwun et al. | |
| 2009/0326865 A1* | 12/2009 | Ziegel et al. | 702/179 |

OTHER PUBLICATIONS

L. Huyse, A. van Roodselaar, 2010, Effects of Inline Inspection Sizing Uncertainties on Corrosion-Related Integrity Management Decisions, NACE 2011 Corrosion Conference, Houston, TX, US, Mar. 2011.
L. Huyse, A. van Roodselaar, 2010, Effects of Inline Inspection Sizing Uncertainties on the Accuracy of the Largest Features and Corrosion Rate Statistics, 23$^{rd}$ Pipeline Pigging and Integrity Management Conference, Houston, TX, Feb. 14-17, 2011.
L. Huyse, A. van Roodselaar, 2010, Effects of Inline Inspection Sizing Uncertainties on the Largest Features and Corrosion Rate Statistics, API Inspection Summit, Galveston, TX, USA, Jan. 2011.
S. Kariyamasam, et al., Effective Improvements to Reliability Based Corosion Management, Proceedings of the 8$^{th}$ International Pipeline Conference, IPC2010-31425 Sep. 27-Oct. 1, 2008,Calgary, Alberta, Canada.
M. Nessim, et al., Obtaining Corrosion Growth Rates From Repeat In-Line Inspection Runs and Dealing With the Measurement Uncertainties, Proceedings of IPC2008, 7$^{th}$ International Pipline Conference IPC2008-64378, Sep. 28-Oct. 3, 2008, Calgary, Alberta, Canada.

(Continued)

*Primary Examiner* — Sujoy Kundu
(74) *Attorney, Agent, or Firm* — Merchant & Gould

(57) ABSTRACT

In one embodiment, a method implemented by a processor that receives plural sets of values corresponding to plural matched pairs of anomalies from a first inspection and second inspection following the first inspection, a first portion of each pair corresponding to the first inspection and a second portion of each pair corresponding to the second inspection, the plural sets of values corresponding to wall loss information for plural locations of a fluid carrying vessel; computes first and second statistical descriptions of a respective accuracy of the first and second inspections; and computes a revised estimate of the plural sets of values based on the first and second statistical descriptions.

15 Claims, 16 Drawing Sheets

OTHER PUBLICATIONS

K. Spencer, et al., A Practical Application to Calculating Corrosion Growth Rates by Comparing Successive ILI Runs From Different ILI Vendors, Proceeding of the 8$^{th}$ International Pipeline Conference, IPC2010 Sep. 27-Oct. 1, 2010, Calgary, Alberta, Canada.

U.S. Appl. No. 12/902,369, filed Oct. 12, 2010 entitled "Prediction of Remaining Life in a Heat Exchanger", Inventor: Luc Huyse et al.
PCT International Search Report, PCT/US2011/042351, filed Jun. 29, 2011, Mail Date: Feb. 24, 2012.

* cited by examiner

| | |
|---|---|
| LOCATION | ESE PLANT ABC |
| HEX ID NUMBER | E-753 |
| DATE OF INSPECTION | 20XX/XX/XX |
| INSPECTION METHOD | EDDY CURRENT - BRASS |
| NOMINAL THICKNESS | 0.065 INCH |
| REPAIR THRESHOLD | 50% |
| TIME PERIOD OF INTEREST | 20 YEARS |

1. ENTER LOCATION NOMINAL WALL, REVIEW CRITICAL WALL LOSS%
2. ENTER ALL RESULTS FOR EACH ZONE
3. CLICK ON THIS BOX WHEN COMPLETE

LIMIT STATES

| | |
|---|---|
| SAFETY | 6: INCIDENTAL |
| SELECTED RISK LEVEL | 6: TOLERABLE RISK IF REASONABLE SAFEGUARDS CONFIRMED |
| LIKELIHOOD INDEX | 1: LIKELY |

| | |
|---|---|
| ASSETS (FINANCIAL) | 5: MINOR |
| SELECTED RISK LEVEL | 6: TOLERABLE RISK IF REASONABLE SAFEGUARDS CONFIRMED |
| LIKELIHOOD INDEX | 2: OCCASIONAL |

| ZONE NUMBER | ZONE 1 | ZONE 2 | ZONE 3 | ZONE 4 |
|---|---|---|---|---|
| NUMBER OF TUBES | 275 | 204 | 204 | 275 |
| NUM_TUBES INSPECTED | 240 | 46 | 52 | 236 |
| AGE AT INSPECTION | 35 | 35 | 70 | 35 |
| DEFECT LIST | 60 | 43 | 47 | 43 |
| | 58 | 37 | 36 | ---- |
| | -- | -- | -- | |
| | 48 | | | |

FIG. 5

ACCURATELY ACCOUNTING FOR SIZING UNCERTAINTY IN INSPECTION

TECHNICAL FIELD

This disclosure relates in general to fluid carrying systems, and more particularly, to integrity assessment of fluid carrying systems.

DESCRIPTION OF THE RELATED ART

Fluid carrying systems may include many components, such as transport pipelines for gas or liquid transmission, refinery piping, heat exchangers, pressure vessels, valves, etc. Such systems may be located in facilities on land, or harder to reach areas, such as off-shore facilities, or in the case of pipelines, in between facilities as a mechanism for transporting gas or liquids over a distance. Over time, components of fluid carrying systems deteriorate, which may compromise the integrity of the fluid carrying system. For instance, corrosion may reduce the wall thickness of heat exchangers, pipes, or pressure vessels to such an extent that leaks or bursts occur, resulting in safety and/or financial consequences that prudent organizations make efforts to avoid. Such efforts include scheduled maintenance, which when done properly, may mitigate the risk of catastrophic failure despite the cost of maintenance downtime. However, if scheduled maintenance is too premature, unnecessary costs may be imposed, a situation exasperated in less accessible locales, such as subsea infrastructures.

SUMMARY

In one embodiment, a method implemented by a processor that receives plural sets of values corresponding to plural matched pairs of anomalies from a first inspection and second inspection following the first inspection, a first portion of each pair corresponding to the first inspection and a second portion of each pair corresponding to the second inspection, the plural sets of values corresponding to wall loss information for plural locations of a fluid carrying vessel; computes first and second statistical descriptions of a respective accuracy of the first and second inspections; and computes a revised estimate of the plural sets of values based on the first and second statistical descriptions.

BRIEF DESCRIPTION OF THE DRAWINGS

The systems and methods described herein can be better understood with reference to the following drawings. The components in the drawings are not necessarily drawn to scale, emphasis instead being placed upon clearly illustrating the principles of the present disclosure. In the drawings, like reference numerals designate corresponding parts throughout the several views.

FIG. 5 is a screen diagram of an embodiment of an example GUI that enables input of values corresponding to maximum inspected anomalies found in tubes among plural zones of a heat exchanger.

DETAILED DESCRIPTION OF EXAMPLE EMBODIMENTS

Figure 1:
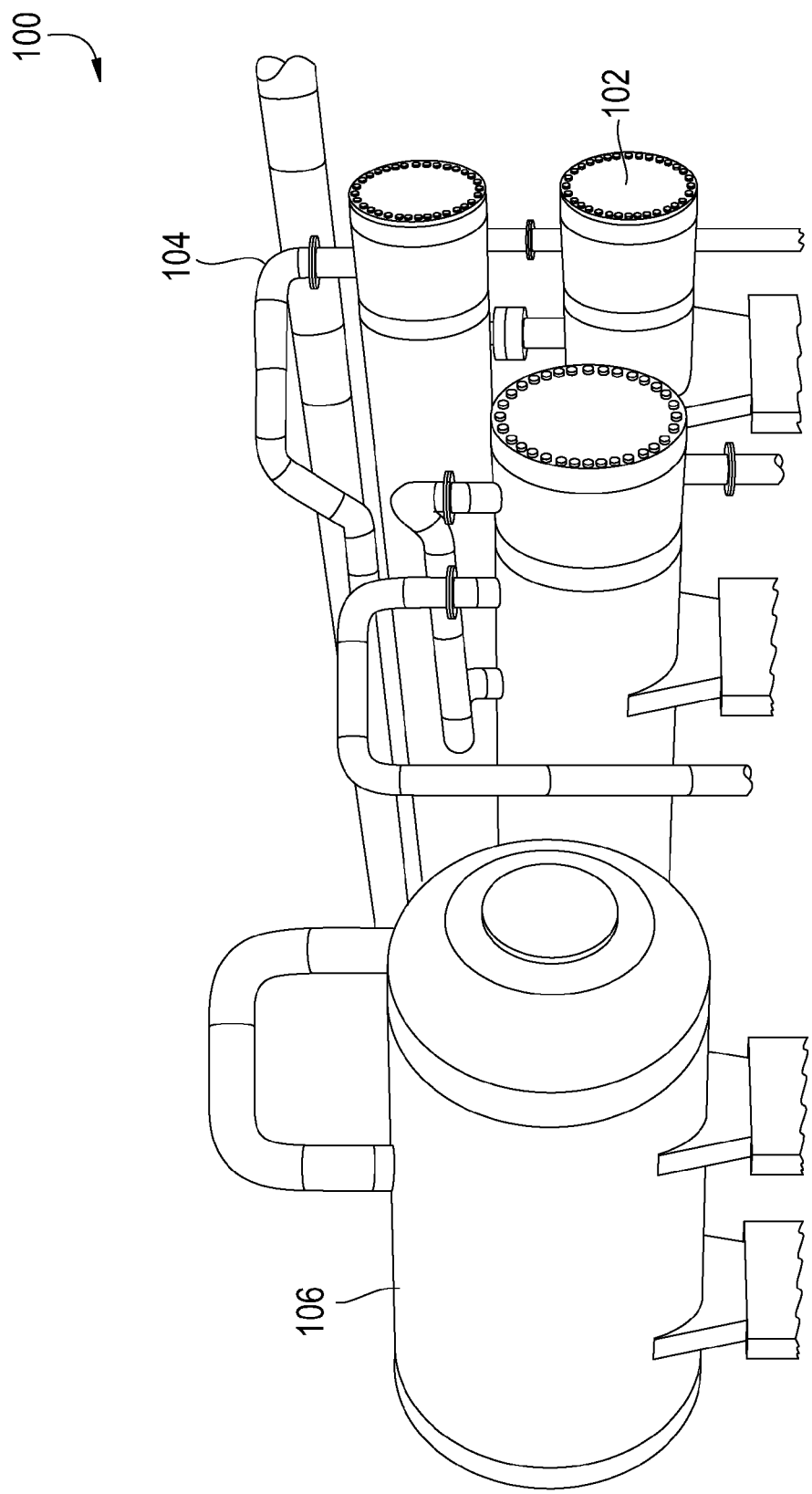
FIG. 1 is a schematic diagram of an example fluid carrying system for which embodiments of integrity assessment systems and methods may be employed.

Disclosed herein are integrity assessment (IA) system and method embodiments (herein, collectively referred to also as an IA system or IA systems) that identify anomalies corresponding to metal loss or otherwise irregular reduction in metal thickness (e.g., caused by erosion, corrosion, and/or other mechanisms causing metal loss) of a fluid carrying vessel (e.g., heat exchanger, pipe, pressure vessel, etc.) that are likely to leak over time, enabling an assessment of the remaining life of the fluid carrying vessel. For instance, for some fluid carrying vessels, such as those embodied as a heat exchanger, it is industry practice to inspect a portion (e.g., 10%) of the entire heat exchanger in what is also referred to as a partial inspection. However, a question may arise as to the condition of the uninspected tubes of the heat exchanger; as such tubes may be a source of the next leak. Further, corrosion in heat exchangers is a stochastic process, and hence an accurate assessment of the likelihood of a leak over a time continuum is desired. Additionally, there is considerable uncertainty in the measured values, varying depending on the material of the vessel, the inspection method, among other factors. Certain embodiments of IA systems address one or more of these issues and hence facilitate a more accurate and judicious approach to integrity management. In one embodiment, an IA system provides one or more graphics user interfaces (GUIs) that enable the receipt of predefined limit states corresponding to plural risk levels and the receipt of values corresponding to maximum-sized anomalies, such anomalies identified in one or more zones of the fluid carrying vessel via nondestructive inspection techniques. Equipped with this information, the IA system computes an estimate of the likelihood of a leak at inspected and uninspected locations, enabling an assessment of remaining heat exchanger life and properly planned maintenance.

For some fluid carrying vessels, such as pipelines, there may be 100% inspection employed, yet there is uncertainty in the measurement accuracy. A similar concern applies to inspections of other fluid carrying vessels, such as heat exchangers, where there may be uncertainty in the accuracy corresponding to the chosen method of inspection. Accordingly, also disclosed are certain IA system embodiments that match each anomaly among plural anomalies identified over plural inspections spaced in time, record values corresponding to the size of the anomaly (e.g., depth, such as wall loss), model the accuracy of each inspection iteration, and compute a revised estimate of the values based on the modeled accuracy of the inspections, and in some embodiments, estimate the growth rate (e.g., corrosion rate, erosion rate, and/or rate of metal loss) of each anomaly based on the revised estimated values. Digressing briefly, it is known that inspection efforts typically highlight those anomalies of maximum size (e.g., deepest depths), but the sizes of those anomalies tend to be overestimated. One result of overestimation is that anomalies identified preliminarily as having the largest size may not actually be the largest, but rather, may possess comparatively smaller anomalies with larger error terms; potentially causing more serious anomalies to be missed and/or premature and costly scheduled maintenance. Certain embodiments of IA systems address these and/or other features, as explained further below.

In general, more accurate estimates of the actual anomaly sizes and the associated growth rates (e.g., corrosion rates) increase the accuracy of the remaining life predictions. Additionally, more accurate estimates of the remaining life allow organizations to make better integrity management decisions. For instance, economic value may be generated through the deferment of unnecessary repairs or re-inspections, and reallocation of inspection resources on heat exchangers or other fluid carrying vessels with highest risk, therefore reducing risk of unexpected leaks in other bundles or vessels. Certain embodiments of IA systems also help with optimal allocation of inspection (e.g., where, when and how much). For instance, during refinery turnarounds inspection may be the critical path. More optimal inspection may reduce the shutdown time and provide added value.

These advantages and/or features, among others, are described hereinafter in the context of an IA system embodied as a computing device, the computing device used in some embodiments to assess anomalies in tubes of a fluid carrying vessel embodied as a heat exchanger, and in some embodiments, to address inaccuracies in inline inspection methods applied to a pipeline. It should be understood that the selection of certain fluid carrying vessels are used for illustration only, and not intended as a limitation in the application of certain embodiments of IA systems and methods. For instance, fluid carrying vessels, such as piping (e.g., refinery or facility piping), pipelines (e.g., trunk or transmission), pressure vessels, heat exchanger tubing, etc., may benefit from the anomaly assessment (e.g., even if partial inspection is not employed), or inaccuracy assessment (e.g., even if not specific to a pipeline) of certain embodiments of the IA systems and methods and hence are contemplated to be within the scope of the disclosure. Further, it should be understood by one having ordinary skill in the art that, though specifics for one or more embodiments are disclosed herein, such specifics as described are not necessarily part of every embodiment.

Attention is directed to an example environment in which one or more types of fluid carrying vessels may reside, and for which certain embodiments of IA systems may be applied. In particular, FIG. 1 is an example fluid carrying system 100 that may reside at an industrial facility, such as a petrochemical plant. Although depicted as a land-based facility, other fluid carrying systems contemplated within the scope of the present disclosure may be located off-shore or outside of production facilities. The fluid carrying system 100 comprises a network of components used to transport, store, and/or process liquid and/or gas. Such components include one or more heat exchangers 102, piping 104, and pressure vessels 106 (heat exchangers 102, piping 104, and pressure vessels 106 collectively, and individually, also referred to as a fluid carrying vessel). The heat exchanger 102, piping 104, and pressure vessel 106 may be constructed of one of a plurality of different types of materials, including carbon steel, stainless steel, galvanized steel, among other materials. As is known, the heat exchanger 102 includes a plurality of individual tubes that may be constructed of carbon steel, brass, stainless steel, among other materials.

The various components of the fluid carrying system 100 are subject to inspection and maintenance as part of an overall integrity management strategy employed by owners or operators of the fluid carrying system 100. For instance, with regard to the heat exchangers 102, regular inspection may be imposed using one or more of a plurality of different inspection techniques. Examples of inspection techniques include nondestructive techniques based on remote field eddy current, ultrasound, among others. In some embodiments, destructive testing may also be employed at least in part. Anomalies on the various tubes of a heat exchanger 102 are identified through these inspection techniques, the anomalies identified along points or locations of the tubing where there is evidence of, for instance, wall loss, with values corresponding to their (the anomaly's) respective measured sizes (e.g., depth). However, one shortcoming of such inspections is that the measurements are subject to varying degrees of sizing uncertainty. For instance, a report generated responsive to such an inspection of the heat exchanger 102 may reveal a wall loss of 30%, when in reality, the extent of wall loss is much less (or greater). Certain embodiments of IA systems may be used to provide a more accurate assessment of the extent of wall loss, enabling prediction of the remaining useful life of the heat exchanger, including an identification of which tubes are presently in need of repair or plugging, and an estimate of when tubes are likely to leak.

Figure 2:
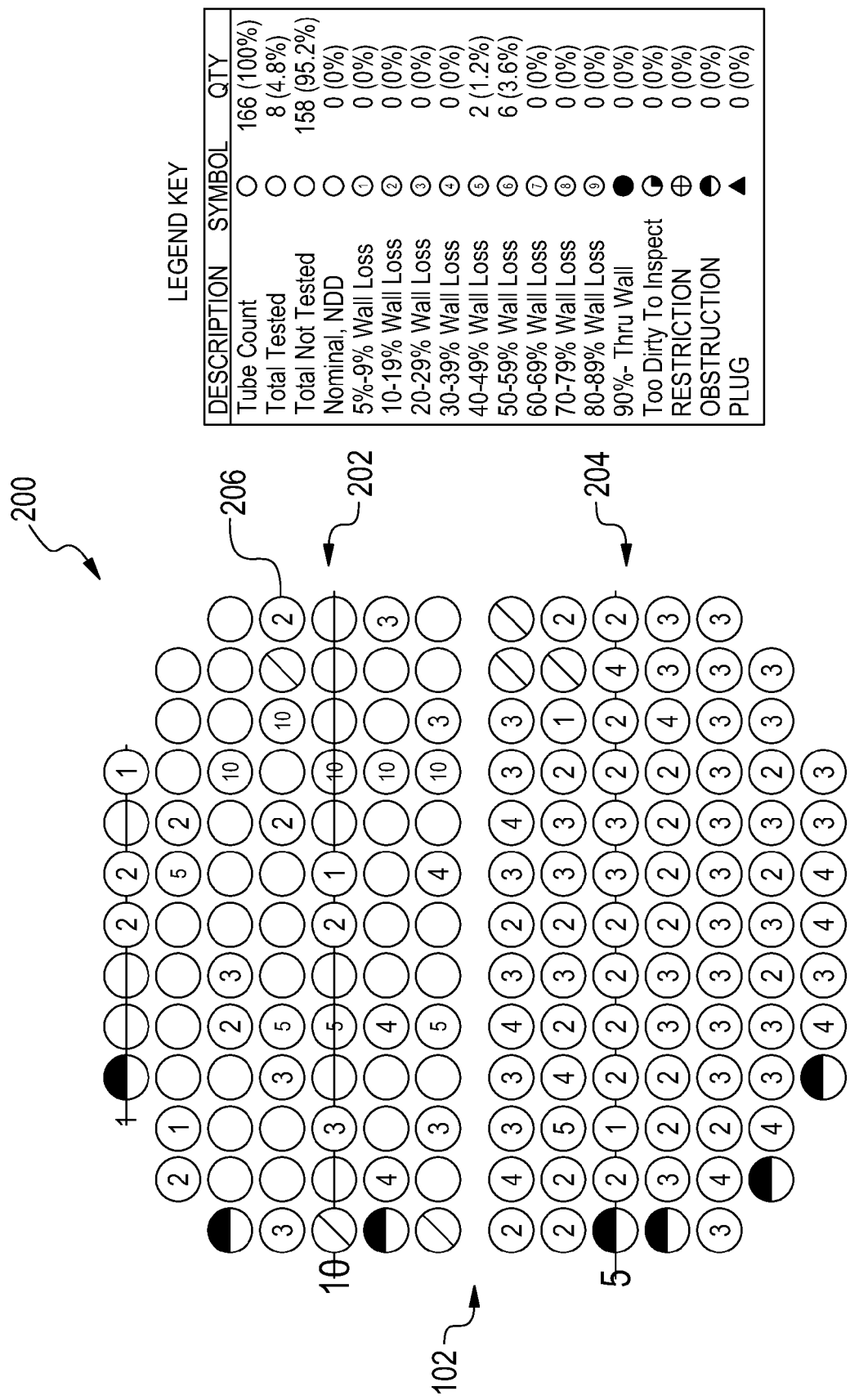
FIG. 2 is a schematic diagram of an example inspection report for a partial inspection of a heat exchanger that is illustrated in cross-section with various symbols conveying the wall loss condition of the respective tubes.

FIG. 2 is an example report 200 that may be generated in response to a nondestructive, partial inspection of the heat exchanger 102, and illustrates another possible shortcoming of an overall integrity management strategy that certain embodiments of IA systems address. The heat exchanger 102 comprises a top half 202 and a bottom half 204 of tubes. Each tube, such as tube 206, is represented by a circle, and shown are different types of circles representing different conditions of the tubes. For instance, a circle with a diagonal line through it represents a tube without detectable anomalies, whereas a clear (e.g., empty) circle symbolizes a tube that has not been tested. A circle that envelopes a number conveys to the user that the associated tube has a defined percentage of measured wall loss, as indicated by the associated legend key. For instance, a circle with the number "1" within it represents a tube where wall loss falls within 5-9%, and a circle with the number "2" within it represents a tube where wall loss falls within 10-19%. As the numbers within a given circle increase, the wall loss percentage increases. It is also noted that circles where half of the interior is darkened symbolizes obstructed tubes.

Based on the extensive quantity of clear circles in the top half 202, it is clear that the heat exchanger 102 has only been partially tested. In practice, especially for heat exchangers 102 with large bundles of tubes, only a small percentage of the total number of tubes may be inspected. However, one possible shortcoming of this type of strategy is that the tube with the worst wall loss may not have been inspected. Certain embodiments of IA systems compute the reliability of the bundle, with due consideration for both inspected and uninspected tubes. Further, certain embodiments of IA systems simulate the potential benefit of performing a full inspection and/or repair, with further consideration of obstructed tubes and plugged tubes; enabling remaining life computations based on the aforementioned scenarios and an identification of tubes likely in need of replacement.

Figure 3:
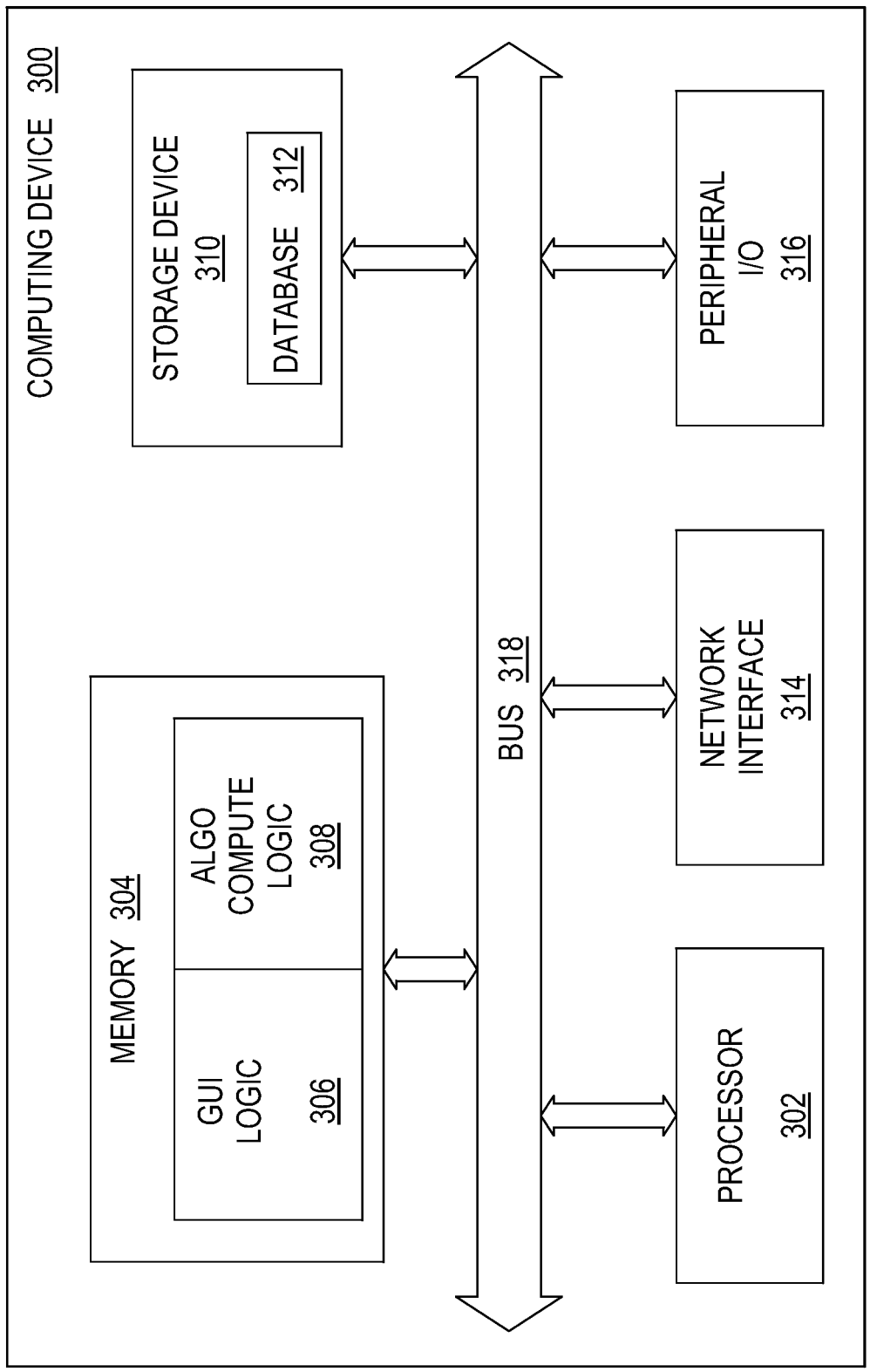
FIG. 3 is a block diagram of an embodiment of an example integrity assessment (IA) system embodied as a computing device.

Having described certain features and/or advantages of employing IA systems as an integral part of a facility's integrity management strategy, attention is directed to FIG. 3, which is a block diagram of one example embodiment of an IA system embodied as a computing device 300. It should be understood that an IA system may be embodied with fewer or some different components, such as the logic (e.g., software code) stored in memory and a processor that executes the logic in some embodiments, or the software logic encoded on a computer readable medium in other embodiments. In some embodiments, the IA system may encompass the computing device 300 and additional components, such as modular inspection systems or remotely located storage devices (e.g., accessed over a network) that comprise data structures, such data structures storing historical data corresponding to manually tested tubes, historical growth rates, among other data.

The computing device 300 contains a number of components that are well-known in the computer arts, including a processor 302, memory 304, a network interface 314, and a peripheral I/O interface 316. In some embodiments, the network interface 314 enables communications over a local area network (LAN) or a wide area network (WAN). In some embodiments, the network interface 314 enables communication over a radio frequency (RF) and/or optical fiber network. The peripheral I/O interface 316 provides for input and output signals, for example, user inputs from a mouse or keyboard, and outputs for connections to a printer or display device (e.g., computer monitor). The computing device 300 further comprises connections to a storage device 310 (e.g., non-volatile memory or a disk drive). For instance, the storage device 310 may comprise one or more database, such as database 312, for storing proprietary data on heat exchanger tubes, historical growth rates, and/or data on other fluid carrying vessels. Databases 312 may be based on any number of known database management systems (DBMS), including hierarchical databases, network databases, relational databases, and object oriented databases. For instance, suitable DBMS are widely available and include ORACLE, SYBASE, MICROSOFT SQL Server, and DB2. One suitable database system is a relational database based on SQL language. The data processing is handled by a database engine (not shown) and can be accessed by various searching means, including Boolean logic evaluation, proximity calculations, and fuzzy logic evaluation. The aforementioned components are coupled via one or more busses 318. Omitted from FIG. 3 are a number of conventional components that are unnecessary to explain the operation of the computing device 300.

In one embodiment, the IA system, or components thereof, is embodied as software and/or firmware (e.g., executable instructions) encoded on a tangible (e.g., non-transitory) computer readable medium such as memory 304 or the storage device medium (e.g., CD, DVD, among others) and executed by the processor 302. For instance, in one embodiment, the software (e.g., software logic or simply logic) includes graphics user interface (GUI) logic 306 and algorithm ("algo") compute logic 308. The GUI logic 306 provides for the display of a GUI that enables the receipt of user information, and/or generates output graphics (or simply, graphics or visualizations) that represent an estimate of the likelihood of a leak in one or more tubes among various zones of a heat exchanger. In one embodiment, the GUI logic 306 is EXCEL-based. The computer readable medium may include technology based on electronic, magnetic, optical, electromagnetic, infrared, or semiconductor technology.

The algo compute logic 308 may comprise functionality (e.g., executable code) to cause the processor 302 to compute algorithms that are stored, for instance, in a dynamic link library (DLL) in memory 304 or the storage device 310. For instance, in one embodiment, the algo compute logic 308 comprises an EXCEL-based computation engine (with macros) comprising binary code compiled in DLL format that enables direct communication (e.g., without an intermediate file) between the library and EXCEL. In general, the algo compute logic 308, when executed by the processor 302, computes an estimate of the annual likelihood of a leak over time with consideration to various limit states (described below). When these limits are exceeded (e.g., safety and/or financial reliability thresholds, though others may also be included in some embodiments), the user is alerted that action must be taken. In one embodiment, the algo compute logic 308 calculates reliability of the heat exchanger bundle as-is, while considering (a) the effect of partial inspection (e.g., it is possible that a partial inspection did not inspect the tube with worst wall loss), (b) the effect of sizing uncertainty (e.g., it is possible that the deepest reported wall loss over or underestimates the true maximum wall loss), (c) the wall loss rate uncertainty (e.g., future wall loss may occur at a different rate than observed in the past), and/or (d) variation in wall thickness (e.g., tube thickness is variable). The algo compute logic 308 also factors in the effect of repair criterion by computing the effect on remaining life, assuming all tubes that exceed a user-defined wall loss percentage are plugged or replaced.

In addition, the algo compute logic 308 simulates the maximum potential benefit of inspection and repair. For instance, if only a partial inspection is performed, the algo compute logic 308 can simulate the benefit that might be gained from performing a full inspection and subsequent repair, while considering the role of obstructed and plugged tubes. To this extent, the algo compute logic 308 reports both the remaining life under such a scenario as well as the number of tubes that likely have to be replaced.

With regard to the sizing uncertainty, in one embodiment, the algo compute logic 308 accounts for the sizing uncertainty using data that is compiled from inspector testing results, wherein the inspectors are qualified (e.g., certified) according to certain detection and sizing accuracy protocols or procedures. The algo compute logic 308 also is responsible for anomaly matching and growth rate (e.g., corrosion rate) computation, as explained further below. Note that functionality of the algo compute logic 308 may be further distributed among separate but cooperating software modules.

In some embodiments, functionality associated with one or more of the various components of the IA system may be implemented in hardware logic. Hardware implementations include, but are not limited to, a programmable logic device (PLD), a programmable gate array (PGA), a field programmable gate array (FPGA), an application-specific integrated circuit (ASIC), a system on chip (SoC), and a system in package (SiP). In some embodiments, functionality associated with one or more of the various components of the IA system may be implemented as a combination of hardware logic and processor-executable instructions (software and/or firmware logic). It should be understood by one having ordinary skill in the art, in the context of the present disclosure, that in some embodiments, one or more components of the IA system may be distributed among several devices, co-located or located remote from each other.

Figure 4:
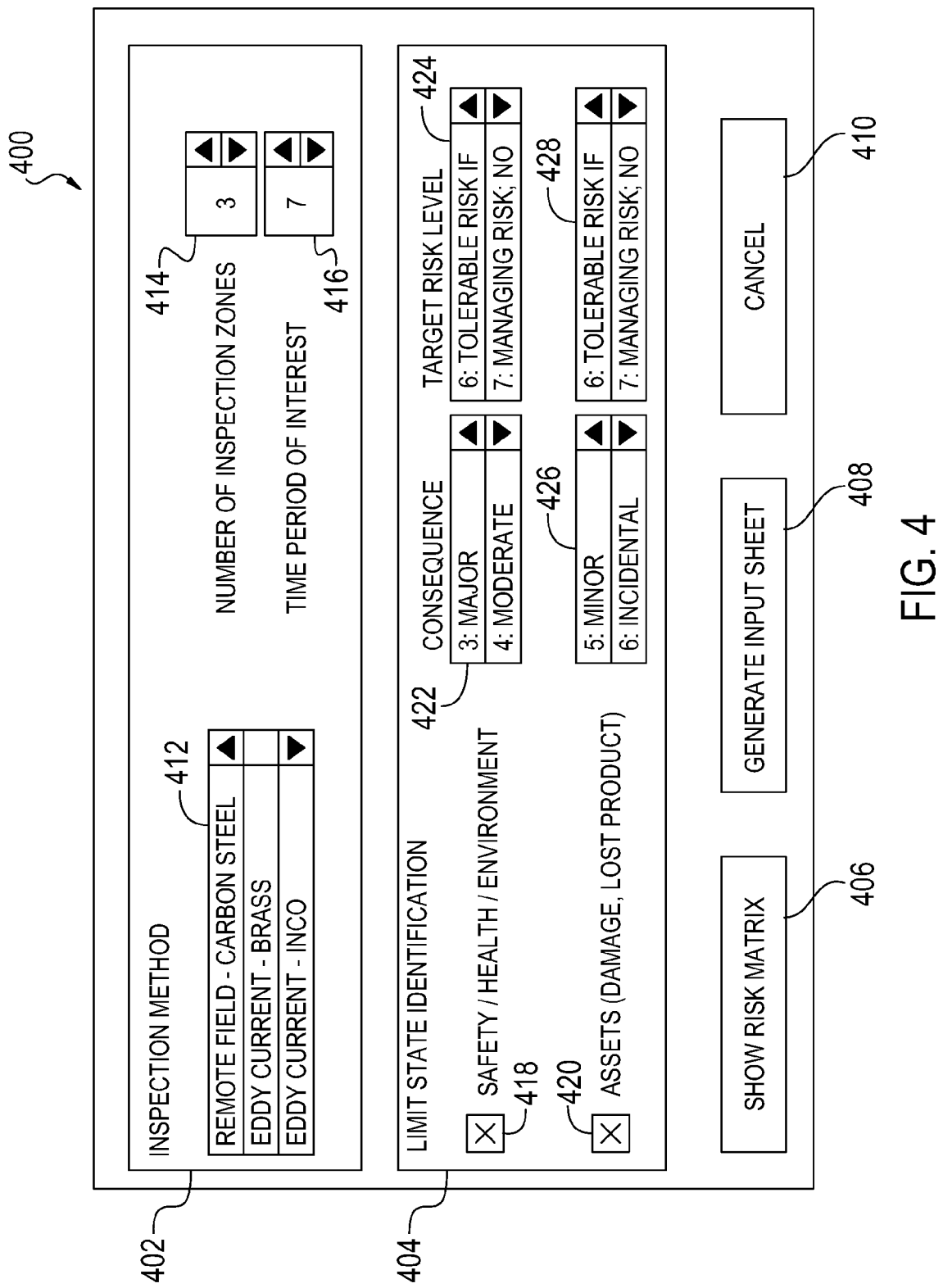
FIG. 4 is a screen diagram of an embodiment of an example graphics user interface (GUI) that enables input of limit states, among other information.

FIG. 4 is a screen diagram of an example graphics user interface (GUI) 400 prompted by the IA system to enable user access to the functionality of the IA system. In some embodiments, the GUI 400 may be prompted in response to successful completion of a prior-displayed security screen (not shown) in which the user may be required to provide information such as name and/or one or more passwords or other information to gain access to the IA system. It should be understood by one having ordinary skill in the art, in the context of the present disclosure, that the GUI 400 shown in FIG. 4 is merely illustrative, and should not be construed as implying any limitations upon the scope of the disclosure. For instance, the GUI 400 may include fewer or additional choices, and/or a different arrangement of GUI features in a single GUI or dispersed among a plurality of GUIs. In one embodiment, the GUI 400 comprises an inspection method section 402, a limit state section 404, and plural option button icons, including a show risk matrix button icon 406, a generate input sheet button icon 408, and a cancel button icon 410.

The inspection method section 402 comprises an inspection method scroll box 412, number of inspection zones scroll box 414, and time period of interest scroll box 416. By selecting the up or down arrow icon of a given box 412, 414, or 416, the user may incrementally scroll through a plurality of predefined choices. Note that reference to scroll boxes hereinafter contemplates a similar scroll functionality and manner of operation. Note that in some embodiments, other mechanisms for providing predefined choices in place of one or more of the scroll boxes 412, 414, and 416 are contemplated to be within the scope of the disclosed embodiments, such as drop-down menus, among others.

The inspection method scroll box 412 comprises predefined choices that a user may select to identify the inspection method (e.g., nondestructive method) used as a basis for obtaining wall thickness data (e.g., to be entered in another GUI). For instance, remote field—carbon steel, and eddy current—brass eddy current—Inco are shown as example choices, with the understanding that a user may scroll through other choices for inspection methods, including such methods as eddy current-stainless, eddy current-duplex steel, ultrasound, radiography, among other known inspection methods.

The number of inspection zones scroll box 414 enables a user to select the number of zones subject to inspection. Digressing briefly, there are various reasons one may choose to break-up a heat exchanger 102 into plural zones. For instance, one reason may be that there has been a partial retubing of the heat exchanger 102 in the past. A new zone should be defined for the retubed section of the exchanger 102 since it has a different age than the remainder of the exchanger. Failure to define a new zone may result in incorrect results. Another reason to differentiate the heat exchanger 102 into different zones is because different inspection coverage may be applied to various parts of the exchanger. For instance, if the inlet area has 100% coverage, but the remainder of the heat exchanger 102 has 20% inspection coverage, separate zones should be defined so that each zone has a uniform coverage. An additional reason for designating different zones is because a reported tube sheet summary may clearly indicate that the wall loss is much more advanced in a certain region of the heat exchanger 102 than in others. By breaking up the exchanger 102 into multiple zones, more accurate results may be produced. For instance, although all tubes are the same age and uniform coverage exists throughout the bundle, physical evidence may suggest that different mechanisms are at work in different parts of the heat exchanger 102. Breaking up the heat exchanger 102 into multiple zones may enable an integrity management strategy where only a part of the exchanger is inspected or retubed. In at least one embodiment, each zone contains at least 20 inspected tubes, and if a zone contains significantly less than that, some zones may be merged. Note that a single zone may also be selected for purposes of IA system analysis.

The time period of interest scroll box 416 enables the user to select how far into the future the predictions should be made. Typical selections of time period or horizon are one or two regular turnaround intervals, which in some implementations, may be manifested as 5-10 years or 7-14 years. In the example shown in FIG. 4, selection of the value "7" refers to seven (7) years from the date of inspection. For instance, plant inspection records may be reviewed a period of time before the seven years expires (e.g., five (5) years from the date of inspection) to assess whether the planned shutdown is feasible without risk of leakage, hence avoiding the costs of an unexpected shutdown.

With regard to the limit state section 404, the user may select checkboxes 418 and/or 420 corresponding respectively to a safety/health/environment limit state (herein, also collectively referred to as a safety limit state), and assets or financial limit states (e.g., damage, lost product). Note that in some embodiments, the two categories corresponding to checkboxes 418 and 420 may be further delineated with respective checkboxes, or replaced by other constraints in some embodiments. In one embodiment, the checkbox 418 is automatically checked as a default, and the user may optionally select the assets checkbox 420 to add the asset constraint. Associated with the safety limit state category are a consequence scroll box 422 and a target risk level scroll box 424. Similarly, associated with the assets limit state category are a consequence scroll box 426 and target risk level scroll box 428. Using the values selected from scroll boxes 422, 424, 426, and 428, the algo compute logic 308 computes an acceptable or target likelihood of an undesirable event based on the severity of the consequence and maximum accepted risk level. In some embodiments, the levels in scroll boxes 422, 424, 426, and 428 may default to non-actionable limit states (e.g., where there is no triggering of operator or user intervention). Guidance on which limit state levels trigger operator intervention and the meaning of the various levels may be ascertained via selection of the show risk matrix button icon 406. In some embodiments, entry of incompatible levels may prompt a warning barker or pop-up that advises the user to re-enter different values, or in some embodiments, cause automatic entry of levels that represent a compromise to the intent of the user entries with or without appropriate warning to the user. Although levels as high as seven (7) are inferred from the values shown in boxes 424 and 428, it should be understood that different quantities of levels may be used in some embodiments, with relatively the same, or different, underlying meanings. In general, any one of a number of risk matrices may be used, for instance tailored to the goals associated with a given facility or organization.

Responsive to selecting the user sheet button icon 408, GUI 500 is provided for display on a display device coupled (via wired wireless connection) to the computing device 300. It should be understood by one having ordinary skill in the art, in the context of the present disclosure, that the GUI 500 shown in FIG. 5 is merely illustrative, and should not be construed as implying any limitations upon the scope of the disclosure. Note that values shown in FIG. 5 are illustrative only, and not intended to correlate identically with the heat exchanger 102 or the GUI 400. For instance, though three zones are selected in FIG. 4, four zones are illustrated in FIG. 5 (whereas in practice, it should be apparent that selection of three zones in GUI 400 results in three zones for assessment in GUI 500). Other examples may be noted. For instance, the GUI 500 may include fewer or additional choices, and/or a different arrangement of GUI features in a single GUI or dispersed among a plurality of GUIs. Further, note that in some embodiments, the GUIs described herein are not limited to EXCEL-based GUIs, but rather, may be web-based pages that enable remote access, such as through browser software or GUI screens embedded in other software codes such as Computerized Maintenance Management Systems.

In one embodiment, the GUI 500 comprises an information summary box 502, safety and assets summary boxes 504 and 506, respectively, zone and tube summary section 508, and instruction/activation box 510. In some embodiments, each of the constituent parts of the GUI 500 may be distinguished by different colors or patterns. For instance, zone and tube summary section 508 may be separated into plural sections. Further, in some embodiments, one or more of the aforementioned components of the GUI 500 may be combined, or in some embodiments, further delineated into separate, distinguishable sections. The information summary box 502 comprises information applicable to the entire heat exchanger 102, including the location, heat exchanger identification number, date of inspection, nominal wall thickness of the tubes, a repair threshold, and time period of interest. A user may insert extra rows in this box 502 if he or she wishes to record additional notes. In one embodiment, default values for the inspection date and repair threshold are provided, but users are encouraged to check these values and make adjustments as necessary. The repair threshold provides a defined delineated value, beyond which the tube is assumed, for purposes of computation, to be taken out of service (e.g., plugged or replaced). Herein, reference to "taking out of service" or plugging the tubes or the like is intended to refer to simulation by the IA system of the physical acts of taking the tubes out of service for purposes of computation, except where it is clear in the context of the description that an actual physical repair is taking place. In other words, any anomaly reported more severe than this threshold value is assumed to be removed. Increasing the repair threshold decreases the number of plugs required, but it also increases the likelihood of a leak in the future. Therefore, this parameter enables a balancing of the likelihood of a leak and the number of tubes that need to be plugged.

The safety and assets summary boxes 504 and 506 provide a record of the choices that were made in GUI 400 regarding the limit states. As indicated previously, these values may differ depending on the application or implemented risk matrix. The GUI 500, and in particular, safety and assets summary boxes 504 and 506, reflects which limit state is checked (both safety and assets in this example, though one or the other 504, 506 may be selected in some implementations), what values were input for the accepted risk levels and consequence indices for each limit state category, as well as the resulting likelihood index for each computed by the algo compute logic 308. As expressed above, though certain definitions are shown in FIG. 5 underlying the values of the selected limit states, it should be understood that other risk matrices and their underlying definitions may be used in some embodiments.

The zone and tube summary section 508 comprises an area where users may enter zone-specific information. For each zone, users input the total number of tubes (e.g., the number of tubes in use, not plugged tubes) as well the number of inspected tubes. Obstructed tubes are not counted as inspected tubes. Users also enter the age of the tubes in each zone, which is used to estimate wall loss rates. The zone and tube summary section 508 also comprises a defect list. The dashed lines in this section 508 symbolize that additional values may be added to the list. Users may import (e.g., paste, file transfer, etc.) the maximum anomaly (e.g., indicated in the section 508 as residing in a "defect list," where the term "defect" is herein used interchangeably with anomaly except where their differences are clear from the context in which defect is described) found in each inspected tube within a given zone. This anomaly information may be entered as a percentage (on a 0 to 100 scale) or as a fraction (on a 0 to 1 scale). Note that for inspection reports that list the remaining wall thickness value (as in some ultrasound-based third party reports), these values are first converted to wall loss by the user. In some embodiments, such remaining wall thickness values may be automatically converted by the algo compute logic 308.

Note that in some embodiments, consistent with the caveat that other example GUIs and/or GUI arrangements are contemplated to be within the scope of the disclosure, a zone and tube summary section may be employed whereby one section lists the zones at issue and another, distinguishable section comprises information electronically imported from an inspection report into the GUI 500 corresponding to the inspected tubes of the various zones at issue. For instance, in the aforementioned one section, one column of zone definitions (e.g., zone 1, zone 2, etc.) may be employed with one or more additional columns dedicated to an identification of the beginning and ending exchanger tube row having information listed in the aforementioned other section. Further, the distinguishable section may comprise such information as an identification of the tube, the row of the exchanger to which it belongs, percent wall loss, a code corresponding to the condition (e.g., pitted, obstructed, plugged, etc.), among other optional information typical to inspection reports.

The instruction/activation box 510 comprises instructions to a user for completing the GUI 500. In some embodiments, additional information may be incorporated in this section 510, or in some embodiments, information icons next to each section (which in some embodiments may replace the information in instruction/activation box 510) may be inserted and activated by user selection (e.g., clicking on the icon by a mouse or other user input device) to enable a user to learn more about completing a given section. When the input is complete, the instruction/activation box 510 is clicked (e.g., using a pointer device, such as a mouse, to single or double click) to cause the algo compute logic 308 to generate the leak likelihood estimates. In one embodiment, though not intended to be limiting but rather used as an example, the calculations may take up to fifteen (15) seconds per zone to complete, although actual computation times depend on the processing power of the computing device 300. Computed results are added to an output chart (e.g., graphic) or other visualization on a per zone basis as they become available.

Figure 6:
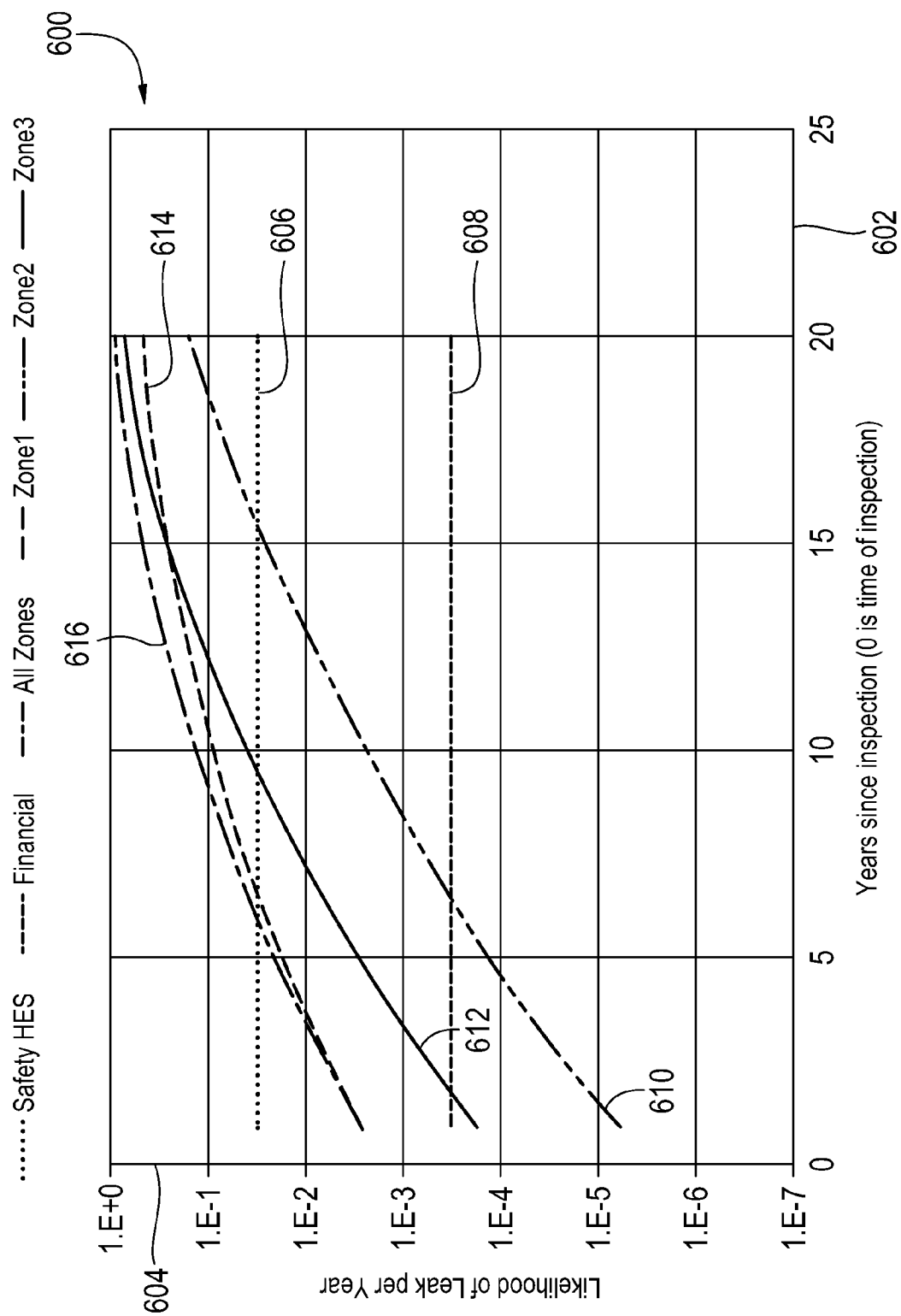
FIG. 6 is a screen diagram of an embodiment of an example output graphic that provides an illustration of a likelihood of a leak estimate over a continuum of time among plural zones of a heat exchanger under a no-action scenario.
Figure 7:
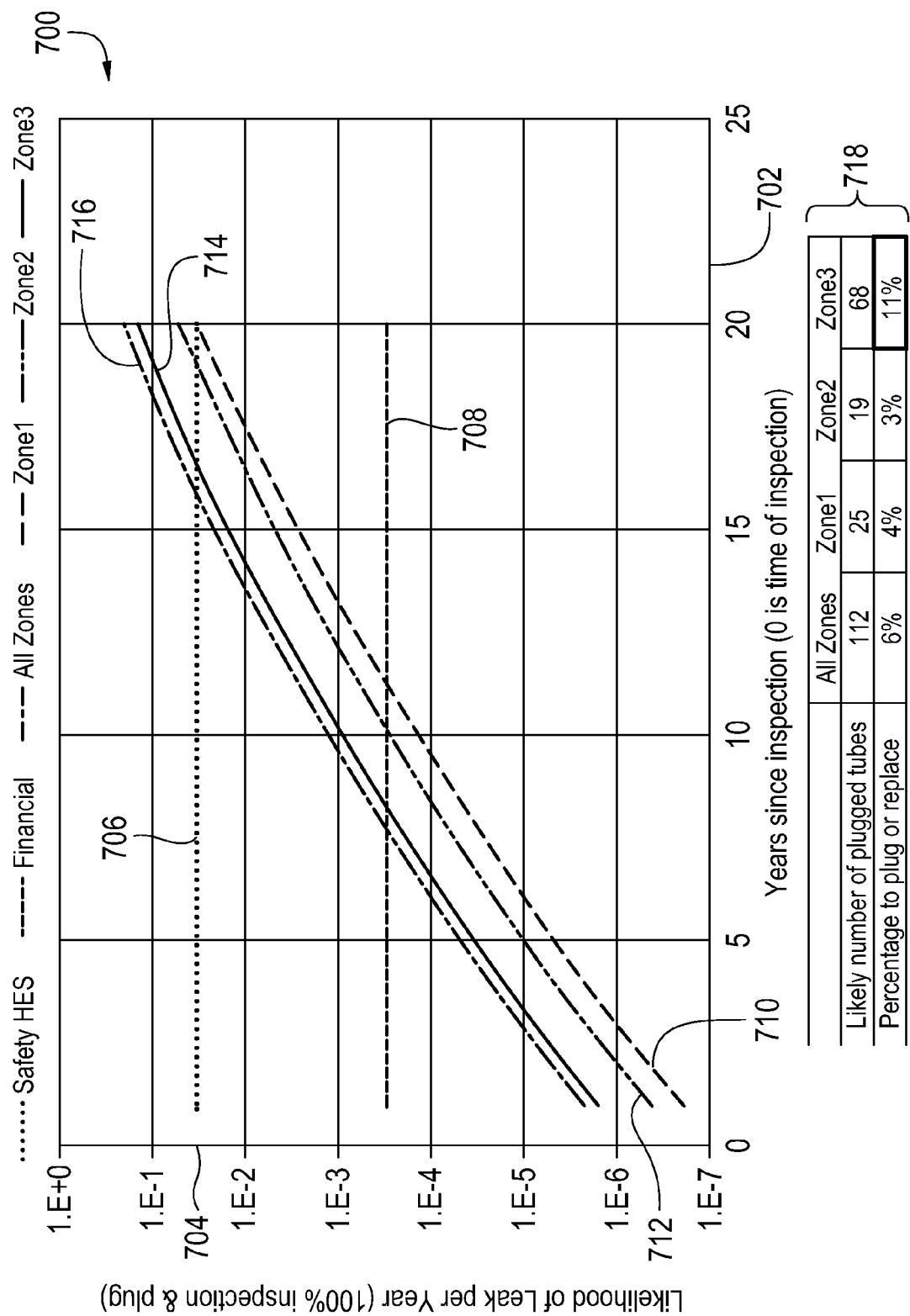
FIG. 7 is a screen diagram of an embodiment of an example output graphic that provides an illustration of a likelihood of a leak estimate over a continuum of time among plural zones of a heat exchanger under a simulated full inspection scenario.
Figure 8:
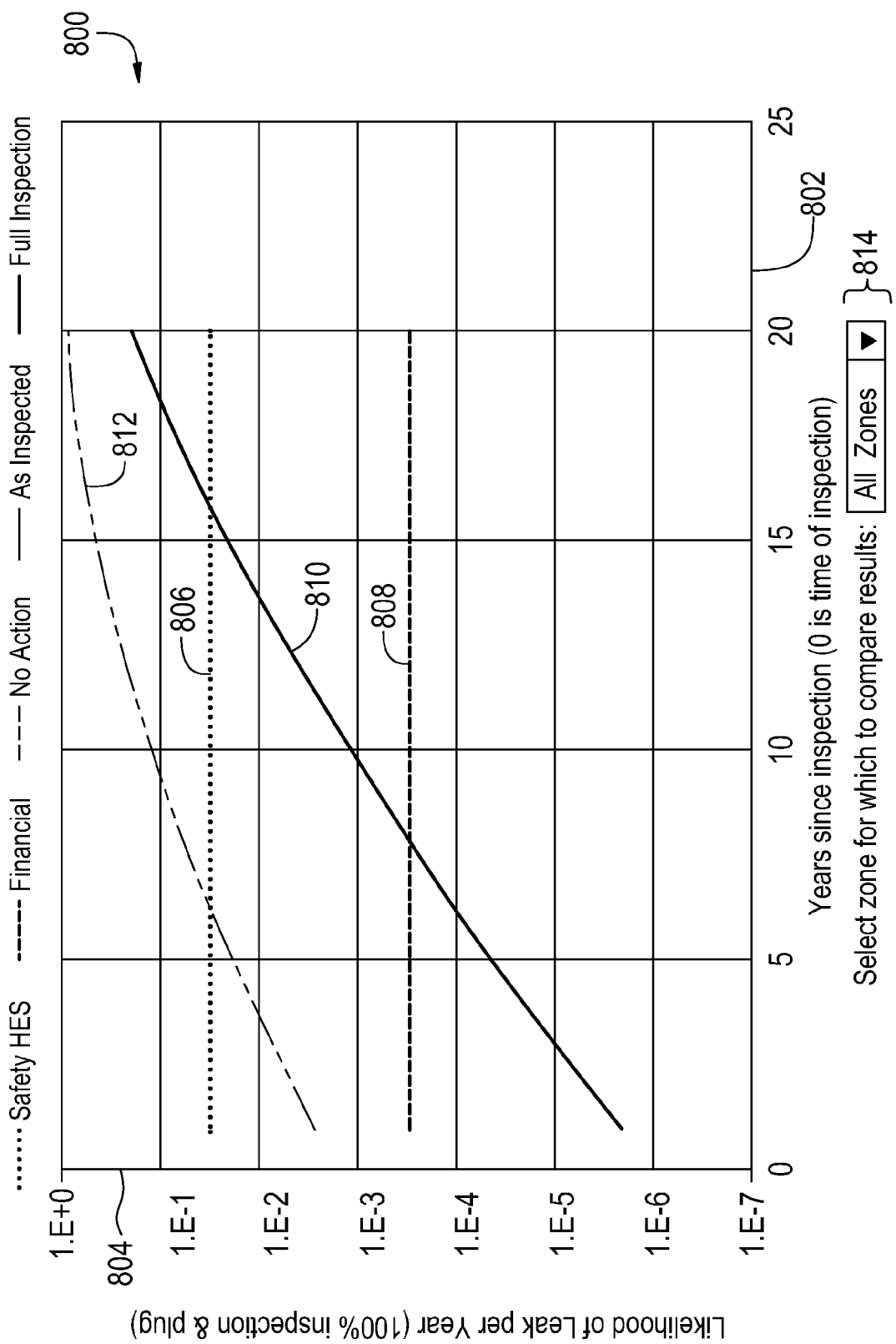
FIG. 8 is a screen diagram of an embodiment of an example output graphic that provides an illustration of a likelihood of a leak estimate over a continuum of time among plural zones of a heat exchanger based on different scenarios.

FIGS. 6-8 are example screen diagrams that provide an illustration of various visualizations (e.g., output charts or output graphics, also referred to herein as merely graphics) that the IA system generates responsive to the inputs entered in the GUIs 400 and 500. It should be understood by one having ordinary skill in the art, in the context of the present disclosure, that the output charts shown in FIGS. 6-8 are merely illustrative, and should not be construed as implying any limitations upon the scope of the disclosure.

For instance, in some embodiments, other visualizations may be implemented, including visualizations in the form of tables, bar charts, among other mechanisms to facilitate an interpretation of the results and enable well-informed integrity management decisions. Referring to FIG. 6, shown is an output graphic 600 embodied as a chart with a horizontal axis 602 indexed in years since inspection and a vertical axis 604 indexed in likelihood (e.g., probability) of leak per year. For instance, and referring to the vertical axis 604, the index "1.E+0" corresponds to a 100% likelihood of a leak. The index immediately beneath index 1.E+0 is designated as "1.E-1," and corresponds to a leak likelihood of 10%. The index beneath 1.E-1 is index 1.E-2, which corresponds to a leak likelihood of 1%, and so on (0.1%, 0.01%, etc.) in similar fashion as one progresses downward along the vertical axis 604. Also shown in FIG. 6 is a legend at the top of the output graphic 600, indicating by line format (e.g., dashed, broken line, etc.) what each respective line symbolizes or represents. In some embodiments, the legend may indicate by color distinction what each respective line in the output graphic 600 represents, or may distinguish via a combination of both line format and color in some embodiments, among other mechanisms of distinction known in the art.

The output graphic 600 further includes horizontal lines 606 and 608 representing safety and asset limit states, respectively, and computed estimate lines 610, 612, 614, and 616 representing tubes in zones 2, 3, 1, and total (i.e., all zones). The horizontal lines 606 and 608 are computed, targeted likelihood estimates based on entries made in the GUI 400. As time progresses, the tube wall (or pipe wall in some implementations) thins due to corrosion (and/or other wall loss mechanisms) and hence the curved lines 610, 612, 614, and 616 indicate how the likelihood of a leak increases over time. In general, the output graphic 600 displays the likelihood of a leak occurring in each year and compares this result against the target likelihood based on safety and asset consequences of a heat exchanger leak if no action is taken and the past process conditions remain essentially unchanged. For instance, in FIG. 6, the output graphic 600 indicates that at the time of inspection, the likelihood of a leak exceeds the target likelihoods and therefore immediate action is required; some tubes either need to be plugged or replaced. In one embodiment, the contribution of each individual zone to the total likelihood of leak is not shown by default but can be added to the summary chart if desired through a macro function.

More specifically, the output graphic 600 illustrates the logical partitioning of a heat exchanger 102 into three (3) separate zones, zones 1, 2, and 3, as represented by curved lines 614, 610, and 612, respectively. Further, the output graphic 600 also comprises an all-zones or total line 616, which represents the contribution, from all of the respective zones 1, 2, and 3, to an overall leak likelihood estimate. For instance, as revealed by the output graphic 600, zone 2 (represented by line 610) appears to have tubes with the least amount of wall loss, as it has the lowest estimated likelihood of a leak among the three zones. At five (5) years, the estimated likelihood of a leak is at 1.E-4 (e.g., 0.01%). At ten (10) years, the estimated likelihood of a leak for tubes of zone 2 is above 0.1%, and surpasses the targeted likelihood 608 (e.g., critical threshold for assets), which enables a user to assess what actions may need to be taken to reduce this risk, such as via plugging or repairing one or more tubes, etc. Note that the second critical threshold represented by line 606 (corresponding to safety) is surpassed by zone 2 after fifteen (15) years. A similar assessment for the other zones, and the total line, may be applied as described above. As indicated above, the output graphic 600 reveals that the total exceeds both thresholds 606 and 608 at the time of inspection, and hence some action is required, as further described in association with FIG. 7 below.

Referring to FIG. 7, shown is an example output graphic 700 embodied as a chart with a horizontal axis 702 indexed in years since inspection and a vertical axis 704 indexed in likelihood of leak per year (based on a simulation of 100% inspection and plugging when the repair threshold has been exceeded). The output graphic 700 further includes horizontal lines 706 and 708 representing safety and asset limit states, respectively, and computed estimate lines 710, 712, 714, and 716 representing tubes in zones 1, 2, 3, and total (i.e., all zones). The manner of interpreting the output graphic 700 is similar to the example given in association with the output graphic 600 of FIG. 6, and hence description of the same is omitted here for brevity. The output graphic 700 further includes a sub-chart 718 that indicates the likely number of plugged tubes per zone and in total, and the percentage of tubes to plug or replace. In general, the output graphic 700 illustrates the results of what leak reduction performance might be achieved if a full inspection were performed and if all tubes with wall loss that exceeds the repair threshold are taken out of service (either plugged or replaced). For instance, the sub-chart 718 in FIG. 7 indicates that if 112 tubes are plugged (e.g., about 7% of all tubes), a remaining safe life up to about 7 to 8 years can be expected (e.g., compared to the output graphic 600, where the total 616 starts above the governing threshold represented by line 608). It is also assumed that the past process conditions remain essentially unchanged; i.e., that past corrosion trends continue (albeit with some uncertainty). For the uninspected tubes, the IA system (e.g., algo compute logic 308 of the IA system) calculates the risk according to the wall loss distribution observed in a particular zone. The IA system also estimates the number of tubes that need to be plugged or repaired. If the number of tubes that need to be plugged or repaired exceeds 10% of the total number of tubes in the zone, this situation is flagged in the sub-chart 718 (e.g., 11% under zone 3 may be visually distinguished, such as via red highlighting, bolder border, among other colors or alert mechanisms). The contribution of each individual zone to the total likelihood of leak may be added to the chart 702 as desired.

For instance, whereas lines 612, 614, and 616 exceeded at least the targeted threshold represented by line 608 in the output graphic 600 (FIG. 6) at year 5, judicious selection of tubes to plug or repair as indicated in the sub-chart 718 enables a lowering of these lines (corresponding to lines 712, 714, and 716) below the same asset threshold (represented by line 708), since the risk of leak is mitigated by the absence of flow through a blocked or repaired tube. In some implementations, given the speed at which the IA systems compute the leak likelihood estimates, a dialogue between an operations person and the user (e.g., engineer or technician) is facilitated by the use of the IA system and this output graphic 700, whereby various iterations of plugging and/or repair scenarios may be investigated with this visual aid for different zones to achieve mutual goals of reducing risk while also maintaining efficiency in operations.

FIG. 8 illustrates another example output graphic 800 that provides (on a single chart) a comparison of three scenarios— no action (not represented by an estimated line in FIG. 8, but rather, coinciding with line 812), as inspected, and full inspection. The output graphic 800 is embodied as a chart with a horizontal axis 802 indexed in years since inspection and a vertical axis 804 indexed in likelihood of leak per year (based on a simulation of 100% inspection and plugging when the repair threshold has been exceeded). The output graphic 800 further includes horizontal lines 806 and 808 representing safety and asset limit states, respectively, and computed estimate lines 810 and 812 representing full inspection and as inspected scenarios, respectively. The drop down box 814 enables a user to select either the entire exchanger or a zone for which to compare the results. Note that the as inspected scenario corresponds to a display of the likelihood of a leak occurring in each year, and includes a comparison of the result against the target likelihood based on safety and asset consequences of a heat exchanger leak if all inspected tubes with wall loss that exceeds the repair threshold are taken out of service (either plugged or replaced). It is also assumed that the past process conditions remain essentially unchanged. For zones with partial inspection (either intentionally—say inspecting only 10 or 20% of the tubes—or due to the presence of obstructed tubes), the IA system (e.g., algo compute logic 308 as executed by the processor 302) calculates the risk associated with the uninspected tubes.

If a full inspection is performed, the "As Inspected" and "Full Inspection" scenarios lead to identical results. However, in the practical case where some tubes are obstructed or intentionally not inspected (due to selection of partial inspection level of—say—10% or 20%), these results may be very different. In one embodiment, when reasonably deep anomalies are found during the inspection, the "as inspected" result only incorporates the effect of plugging or replacing tubes that were actually inspected. It is however quite likely that the uninspected portion of the heat exchanger 102 also contains tubes with deep wall loss. The "as inspected" scenario takes this possibility (and the associated risk) into consideration and that explains why "as inspection" results look very similar to "No Action" results and not like "Full Inspection results" if deep anomalies are present. Unless a full inspection is performed, one cannot determine which tubes need to be plugged.

Returning to an explanation of the output graphic 800, in general, this graphic 800 may be created for the heat exchanger 102 as a whole or for each individual zone. The chart allows a user to quickly assess: (a) if running the heat exchanger 102 without action is acceptable; (b) how effective the current inspection is (e.g., for a partial inspection, it is possible that plugging tubes is ineffective because of the potential that other, uninspected, tubes may also have large wall loss); and (c) how effective a full inspection would be and how extensive a repair would be necessary, which helps to make a decision whether more inspection should be attempted or the heat exchanger 102 should be completely retubed.

By default, the IA system (e.g., GUI logic 306 in cooperation with the algo compute logic 308) plots the failure probability (i.e., a different perspective in the manner of assessing the output graphics) of the entire heat exchanger 102 as function of time so the users may compare the predicted reliability against the targets associated with each of the limit states. The failure probability is given by the probability that the largest anomaly exceeds the critical wall loss value. Users may click on sections 504 and/or 506 to add exceedance probabilities for individual zones. In one embodiment, the exceedance probability for the entire heat exchanger 102 should remain below the targets. Individual zone exceedance probabilities may help to identify which zones are the greatest contributors to the overall risk.

Note that some embodiments of IA systems may employ output graphics where the risk level is associated with the vertical axis (e.g., titled, "reliability threat prioritization number") with different values than those presented above, and limit states are shown as merely inspect and repair alarm levels or thresholds (e.g., lines running horizontal). The "inspect" line may be lower (e.g., the governing line) on the chart than the repair line, and estimates falling between these lines are revealed as falling in a sort of "warning" zone that repair needs may be forthcoming. If the risk exceeds these respective repair or inspect lines, an inspection is triggered or a likely repair (e.g., triggers a planning or pre-ordering strategy) is indicated.

Having described the IA system in the context of accurately predicting the remaining life of a heat exchanger 102, attention is directed to accurately accounting for sizing uncertainty in inspections. Digressing briefly, and in general, sizing accuracy is finite, and some inspection tools are more accurate than others. But generally speaking, sizing inaccuracy of non-intrusive inspection is sufficient to warrant explicit treatment. For pipelines, anomalies are typically sized by in-line inspection instruments within 10%. Analysis of inspection results has shown the results of validation efforts. Internal, proprietary data indicates that the 80% confidence bounds for the sizing accuracy of some techniques may be as accurate as ±5% or as inaccurate at ±20%, depending on the technique that is used. For instance, for vessels configured as pipelines, for about 250 external anomalies on a pipeline that are excavated and measured, the sizing errors generally fall within 10% tolerance. One approach indicates that independence between "true value" and "sizing error" may imply a certain amount of statistical dependence between "measured value" and "sizing error." Analysis generally bears out that, if sizing errors are independent of the true depths, the deeper reported values (e.g., for anomalies) have a higher likelihood of being overestimates of the true anomaly size—even if the overall inspection tool performance falls within the specified tolerances. This analysis explains why an assessment of tool sizing error needs to occur on a statistical basis. A second feature is the effect of sizing error on the estimation of the growth (e.g., corrosion) rate. Sizing error may cause the distribution of anomaly sizes to be wider than in reality, which also has a very significant impact on the width of the corrosion rate distribution. Analysis (e.g., via computer simulation as well as through comparison of historical records) shows that the measured values (e.g., of corrosion rate) cover a much larger range than the true values. Note that due to sizing errors, negative values (which are physically impossible) may be recorded. Very conservative approaches have been used in the past, often leading to frustration and perhaps exasperation at the lack of available solutions.

Figure 9:
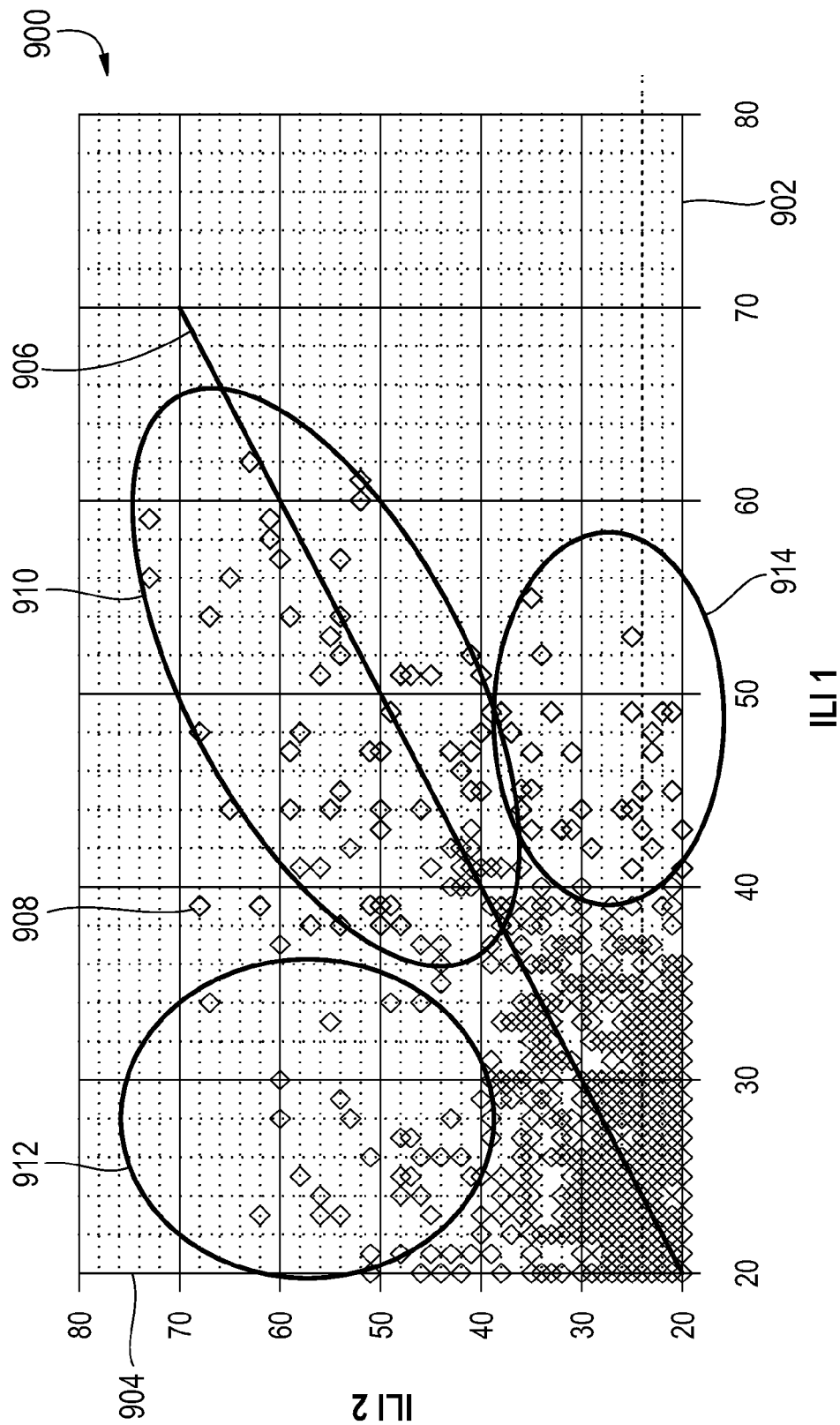
FIG. 9 is a graphic that illustrates uncertainty in measurement of anomalies in a fluid carrying vessel and an example mechanism to provide a more accurate assessment of anomaly sizes and corrosion rates.

FIG. 9 graphically illustrates the aforementioned inaccuracy problem and a mechanism employed by certain embodiments of the IA systems to offer one solution to the problem. In particular, FIG. 9 comprises a graphic 900 that comprises a horizontal axis 902 corresponding to a first in-line inspection (ILI1) and a vertical axis 904 corresponding to a second in-line inspection (ILI2). Unity line 906 provides a basis for understanding growth rates for measured anomalies, such as those indicated by diamonds 908. The IA system (e.g., algo compute logic 308 as executed by the processor 302) cross-plots the matched anomalies from the first and second inspections (ILI1 and ILI2). If there is no growth and no sizing uncertainty, all data falls on the unity line 906. Data points above the unity line 906 indicate growth, whereas data points below the unity line 906 indicate bias between two inspections (hence requiring validation). Due to sizing uncertainties and pair mismatches, some data falls significantly outside the range, as represented by elliptical areas 912 and 914. Accordingly, data points located within the elliptical area 910 are used to compute an accurate estimate of the growth (e.g., corrosion) rate.

In general, the IA system (e.g., via the algo compute logic 308 as executed by processor 302) accurately accounts for sizing uncertainty by providing two, complementary, components in its solution. First, there is an interpretation of individual inspection results, since as indicated above, there tends to be an overestimation bias for the deeper anomaly reports and underestimation of the shallower anomalies as well as an underestimation for the shallower anomalies. Secondly, there is a more accurate calculation of corrosion rates. In other words, the sizing error tends to artificially inflate the spread in the corrosion rate distribution. The IA system filters out some of the noise and therefore improves the accuracy of the corrosion rates. Though described in the context of pipelines (e.g., as evidenced by ILI methods), the accounting for sizing uncertainty may be employed in remaining life predictions for various types of fluid carrying vessels, including pressure vessels and piping and heat exchangers 102.

A more detailed method employed by IA systems with respect to sizing uncertainty is described below and also later in more summary fashion in the context of flow diagrams 14-16. For instance, certain embodiments of IA systems more accurately predict the corrosion rate of a given anomaly by starting with matched pairs (e.g., sets of anomalies which are deemed to represent the same anomalies (e.g., same location) for separate inspections that may be several years apart in some instances. Each of the inspections comprises a specified accuracy, modeled (by the IA system) by a distribution. Such a model creates estimates for both the most likely values of the anomalies themselves as well as the corrosion rates of each of the anomalies. The resulting statistical corrosion rate model can take into consideration the dependence (or lack thereof) of future corrosion rates on past observed rates, and the dependence (or lack thereof of future corrosion rates on the past observed anomaly sizes. Accordingly, one embodiment of an IA system begins with the matched anomalies $m_{1,1}$ through $m_{1,n}$ at time $t_1$ and $m_{2,1}$ through $m_{2,n}$ at time $t_2$ through $m_{m,1}$ through $m_{m,n}$ at time $t_m$. The IA system also begins with a statistical description of the accuracy (e.g., error "e") of each inspection at time $t_1$, $t_2$, through $t_m$. From this basis, the IA system computes most likely values of the set of matched anomalies $d_{1,1}$ through $d_{1,n}$ at time $t_1$ and $d_{2,1}$ through $d_{2,n}$ at time $t_2$ through $d_{m,1}$ through $d_{m,n}$ at time $t_m$. From the computation of the most likely values of matched anomalies, the IA system computes the corrosion rates for each set of matched pairs, which gives rise to the observed values of m=d+e at each of the inspection times, subject to the following constraints: (a) m=d+e (measured value is equal to the sum of the unknown, 'true' value+a sizing error); (b) the corrosion rate is statistically compliant with the postulated corrosion models. Note that in some embodiments, one or more corrosion rate models may be postulated, including (1) future growth independent of past growth; (2) future growth conditionally dependent on past growth with a correlation that is independent of the actual wall loss observed during one or more inspections; (3) future growth is conditionally dependent on past growth with correlation that is itself functionally dependent on the actual wall loss observed ruing one or more inspections. A summary of one or more of these processes is described below in association with a respective flow diagram.

Figure 10:
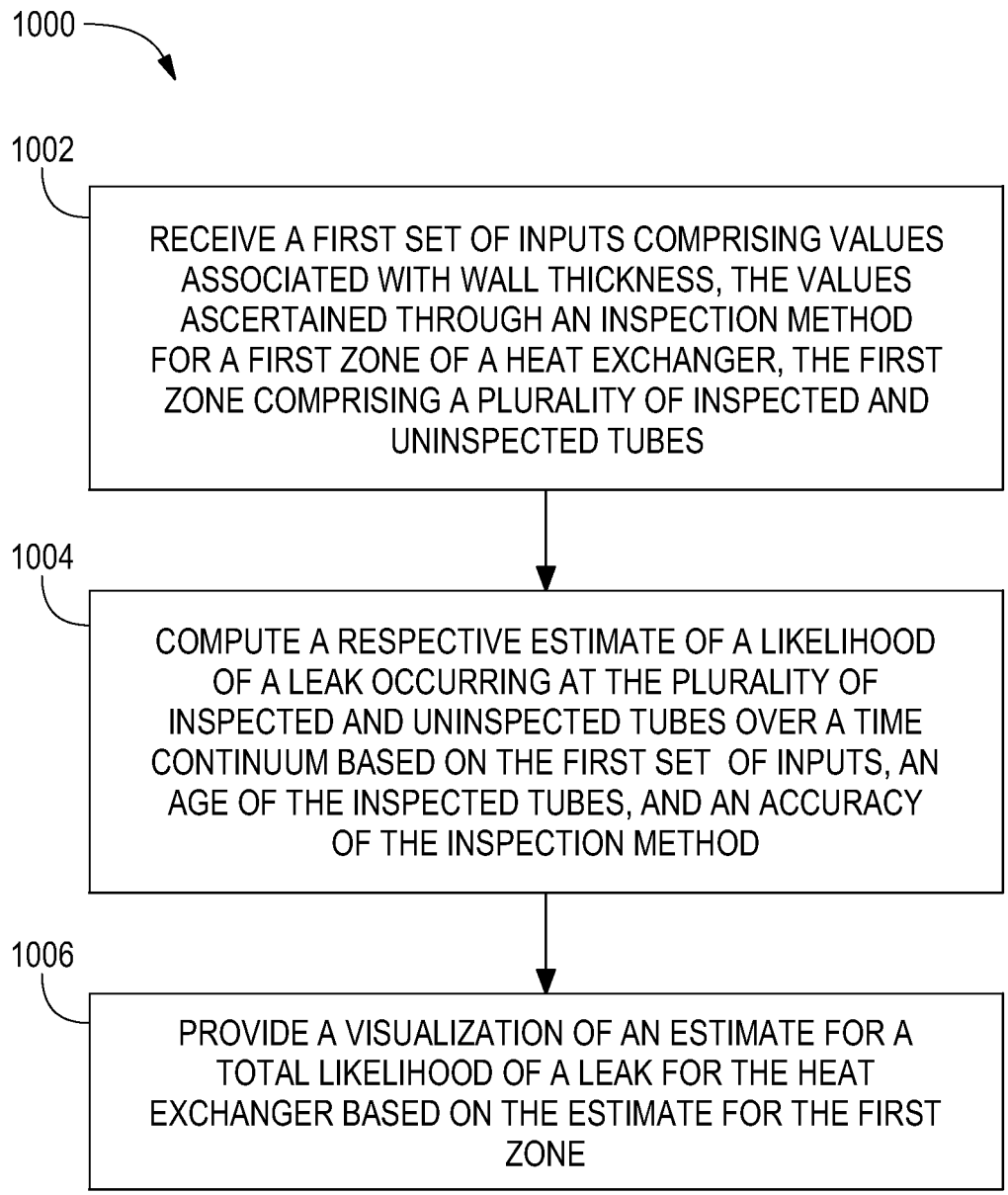
FIGS. 10-13 are flow diagrams that illustrate example method embodiments for estimating leak likelihoods in a fluid carrying vessel.

It should be appreciated, in the context of the present disclosure, that one embodiment of a method to compute the likelihood of a leak, referred to as method 1000 as shown in FIG. 10 and implemented by the computing device 300 (e.g., via the processor 302 executing one or more software logic in memory 304), includes receiving a first set of inputs comprising values associated with wall thickness, the values ascertained through an inspection method for a first zone of a heat exchanger, the first zone comprising a plurality of inspected and uninspected tubes (1002), computing a respective estimate of a likelihood of a leak occurring at the plurality of inspected and uninspected tubes over a time continuum based on the first set of inputs, an age of the inspected tubes, and an accuracy of the inspection method (1004), and providing a visualization of an estimate for a total likelihood of a leak for the heat exchanger based on the estimate for the first zone (1006).

Figure 11:
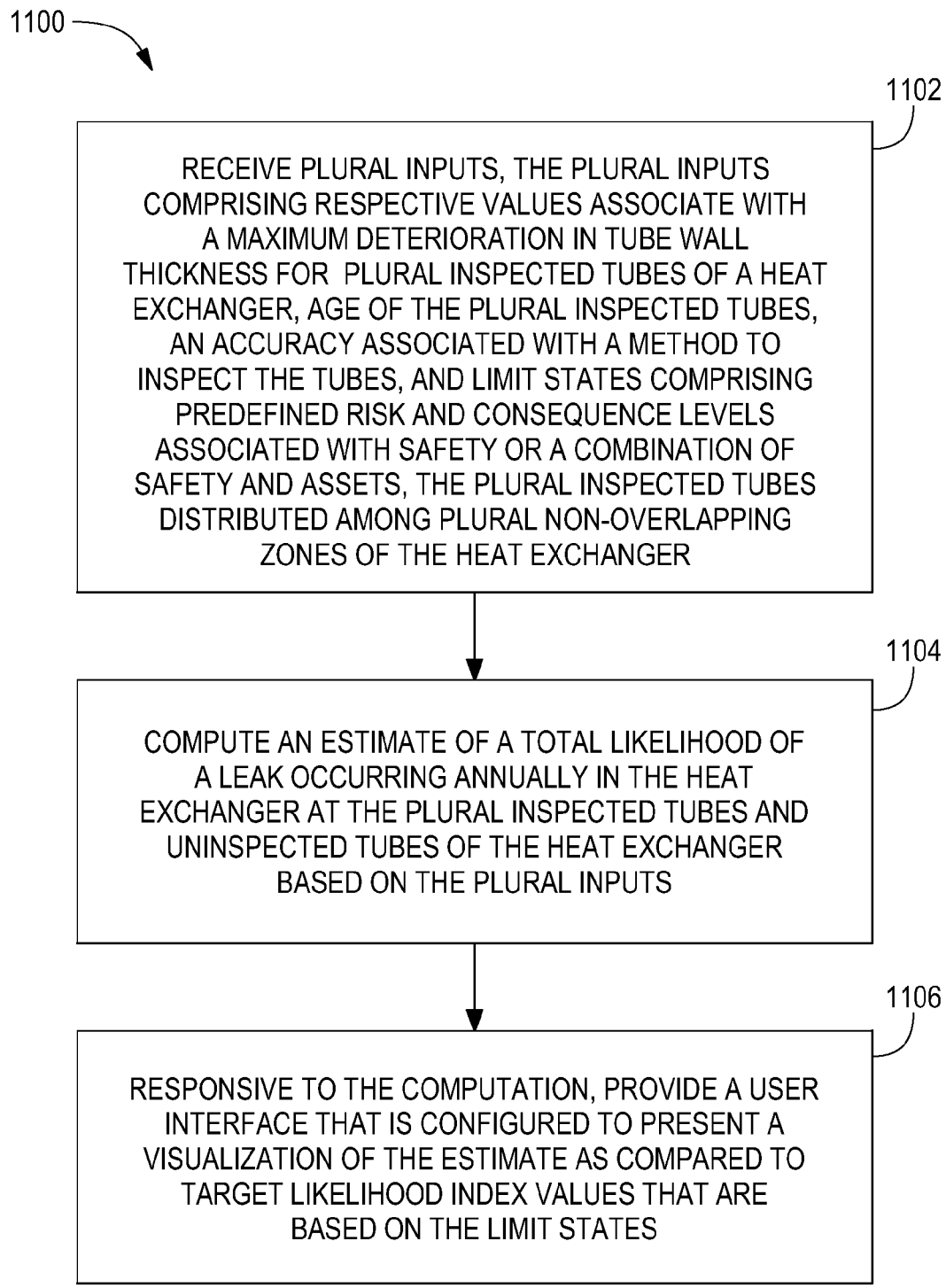

Another embodiment of a method 1100, shown in FIG. 11 and implemented by the computing device 300 (e.g., via the processor 302 executing one or more logic in memory 304) to estimate the likelihood of a leak, includes receiving plural inputs, the plural inputs comprising respective values associated with a maximum deterioration in tube wall thickness for plural inspected tubes of a heat exchanger, age of the plural inspected tubes, an accuracy associated with a method to inspect the tubes, and limit states comprising predefined risk and consequence levels associated with safety or a combination of safety and assets, the plural inspected tubes distributed among plural non-overlapping zones of the heat exchanger (1102), computing an estimate of a total likelihood of a leak occurring annually in the heat exchanger at the plural inspected tubes and uninspected tubes of the heat exchanger based on the plural inputs (1104), and responsive to the computation, providing a user interface that is configured to present a visualization of the estimate as compared to target likelihood index values that are based on the limit states (1106).

Figure 12:
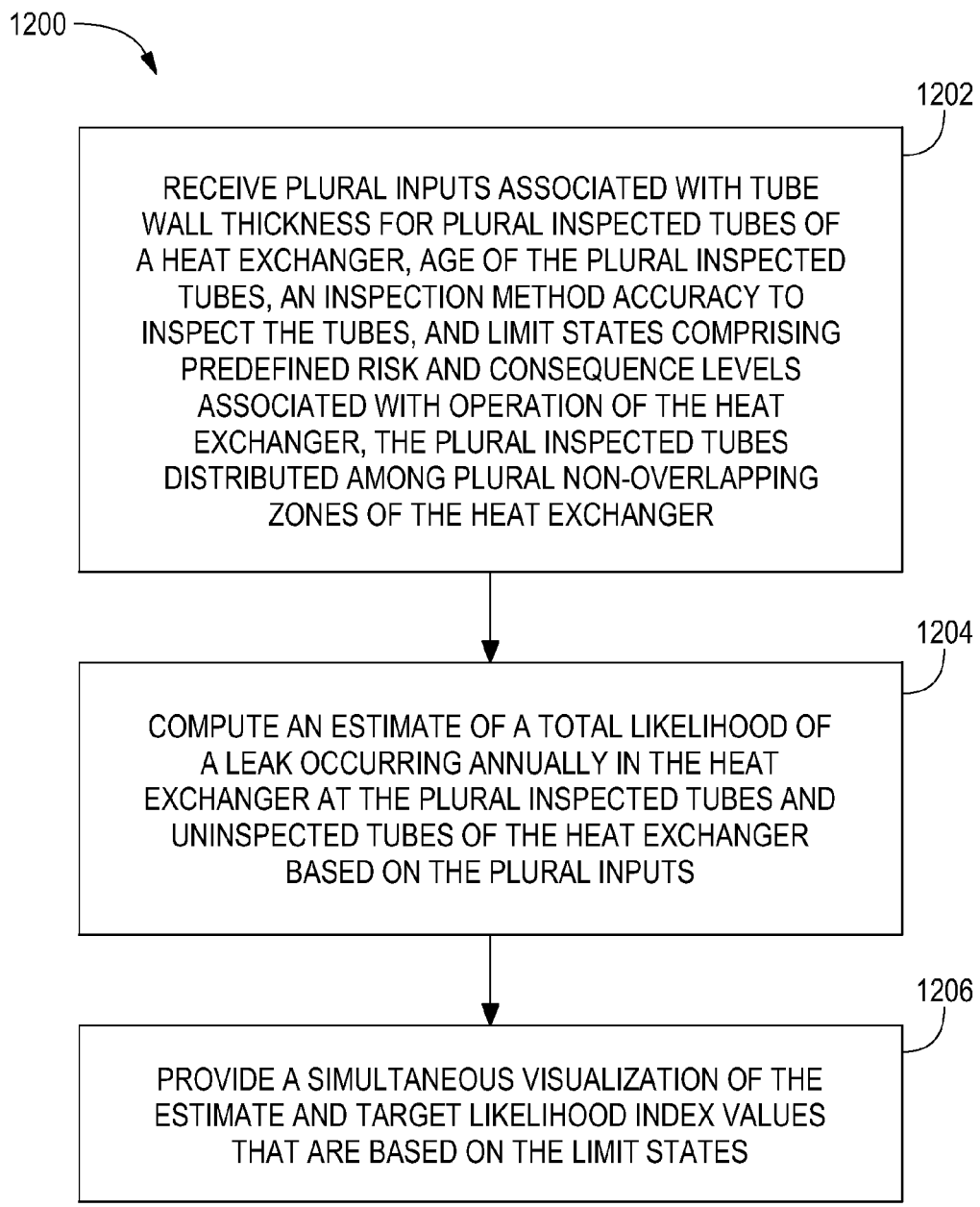

Another embodiment of a method 1200, shown in FIG. 12 and implemented by the computing device 300 (e.g., via the processor 302 executing one or more logic stored in a computer readable medium) to estimate the likelihood of a leak includes receiving plural inputs associated with tube wall thickness for plural inspected tubes of a heat exchanger, age of the plural inspected tubes, an inspection method accuracy to inspect the tubes, and limit states comprising predefined risk and consequence levels associated with operation of the heat exchanger, the plural inspected tubes distributed among plural non-overlapping zones of the heat exchanger (1202), computing an estimate of a total likelihood of a leak occurring annually in the heat exchanger at the plural inspected tubes and uninspected tubes of the heat exchanger based on the plural inputs (1204), and providing a simultaneous visualization of the estimate and target likelihood index values that are based on the limit states (1206).

Figure 13:
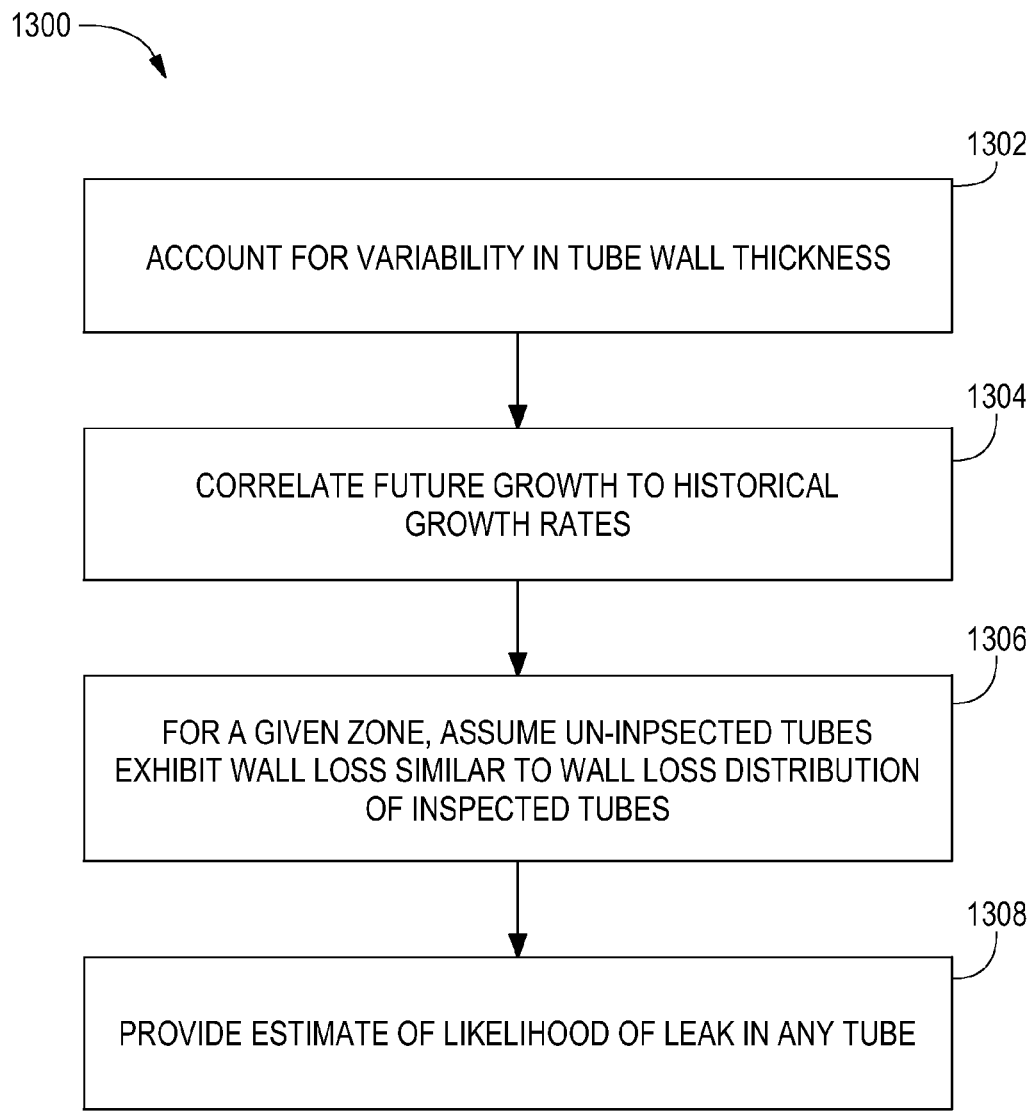

Another embodiment of a method 1300, shown in FIG. 13 and implemented by the computing device 300 (e.g., via the processor 302 executing one or more logic stored in a computer readable medium) to estimate the likelihood of a leak. The method 1300 starts with an initial collection of data based on inspection reports, comprising a set of anomalies based on inspection of tubes in one more zones of a heat exchanger 103, a set of best estimates for time-averaged growth (e.g., corrosion, etc.) rates for each anomaly, and an overall statistical distribution of growth rates. Then, for each time increment, the method 1300 computes an estimate of the likelihood of a leak for any given tube by accounting for variability in tube wall thickness (1302), correlating future growth to past historical growth rates (1304). For instance, the historical growth rates may be stored in the database 312 of the storage device 310, among other storage locales. Further, it is noted that the amount of uncertainty on future growth rates depends on the time lag. For instance, the further out into the future a prediction is made, the lesser the correlation between past and future growth rates is likely to be. Though performable via standard Monte Carlo simulations, it should be understood that advanced analytical approaches may be employed to improve accuracy and performance. The method 1300 further comprises, for each zone, operating on an assumption that un-inspected tubes exhibit wall loss similar to wall loss distribution of inspected tubes (1306). For instance, the wall loss distribution is derived from the inspected tubes is assumed to also apply to the uninspected tubes of a given zone. The method 1300 continues by providing an estimate of a likelihood of a leak in any given tube. It is noted that in some embodiments, and particularly for large systems, only the contribution from the most important tubes is explicitly computed, which enables a significant reduction in computer time while maintaining sufficient accuracy.

Figure 14:
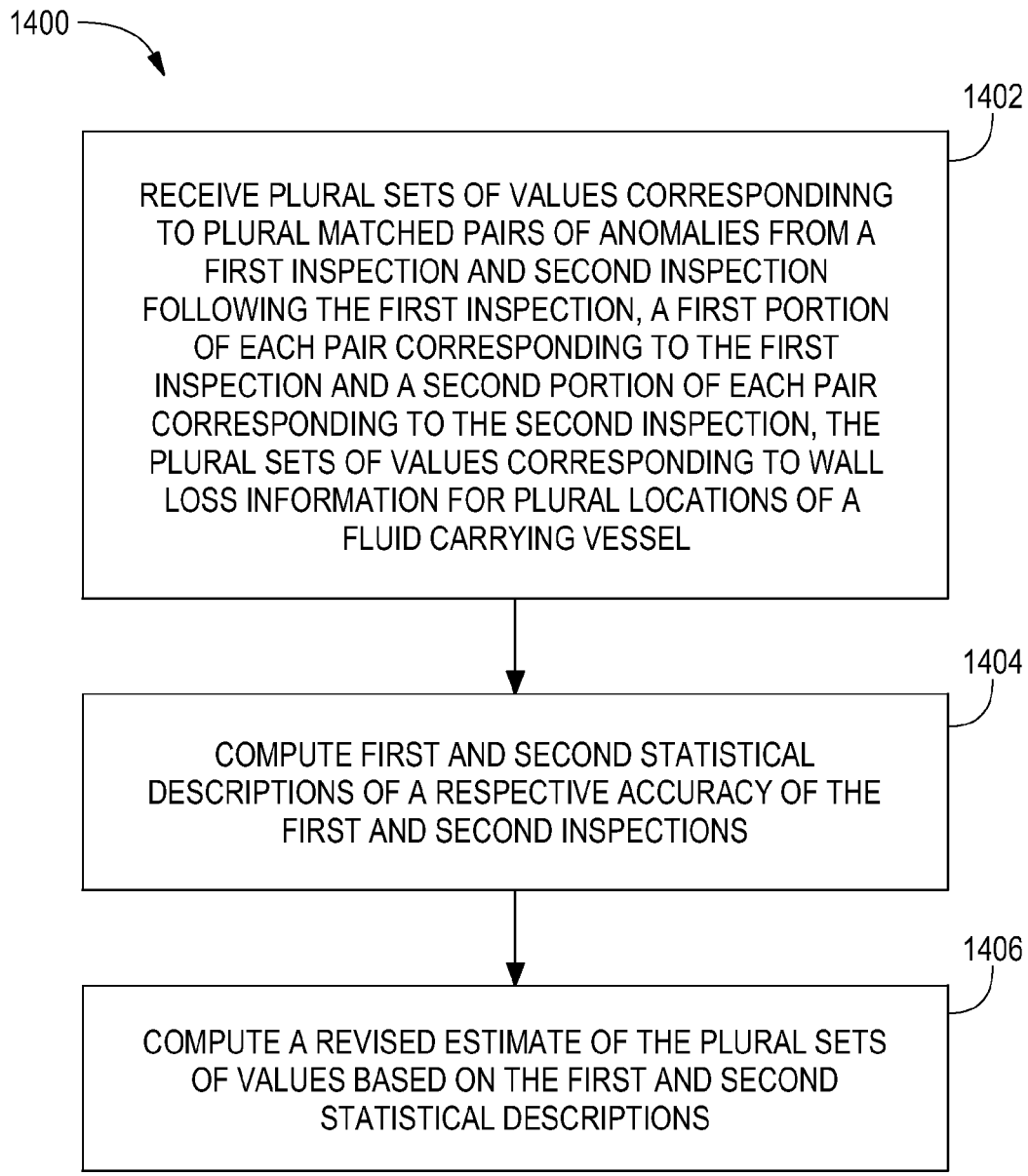
FIGS. 14-16 are flow diagrams that illustrate example method embodiments for providing a more accurate estimate of anomaly sizes and/or corrosion rates associated with the anomalies.

Another embodiment of a method 1400, shown in FIG. 14 and implemented by the computing device 300 (e.g., via the processor 302 executing one or more logic stored in memory 304) to account for sizing uncertainty includes receiving plural sets of values corresponding to plural matched pairs of anomalies from a first inspection and second inspection following the first inspection, a first portion of each pair corresponding to the first inspection and a second portion of each pair corresponding to the second inspection, the plural sets of values corresponding to wall loss information for plural locations of a fluid carrying vessel (1402), computing first and second statistical descriptions of a respective accuracy of the first and second inspections (1404), and computing a revised estimate of the plural sets of values based on the first and second statistical descriptions (1406).

Figure 15:
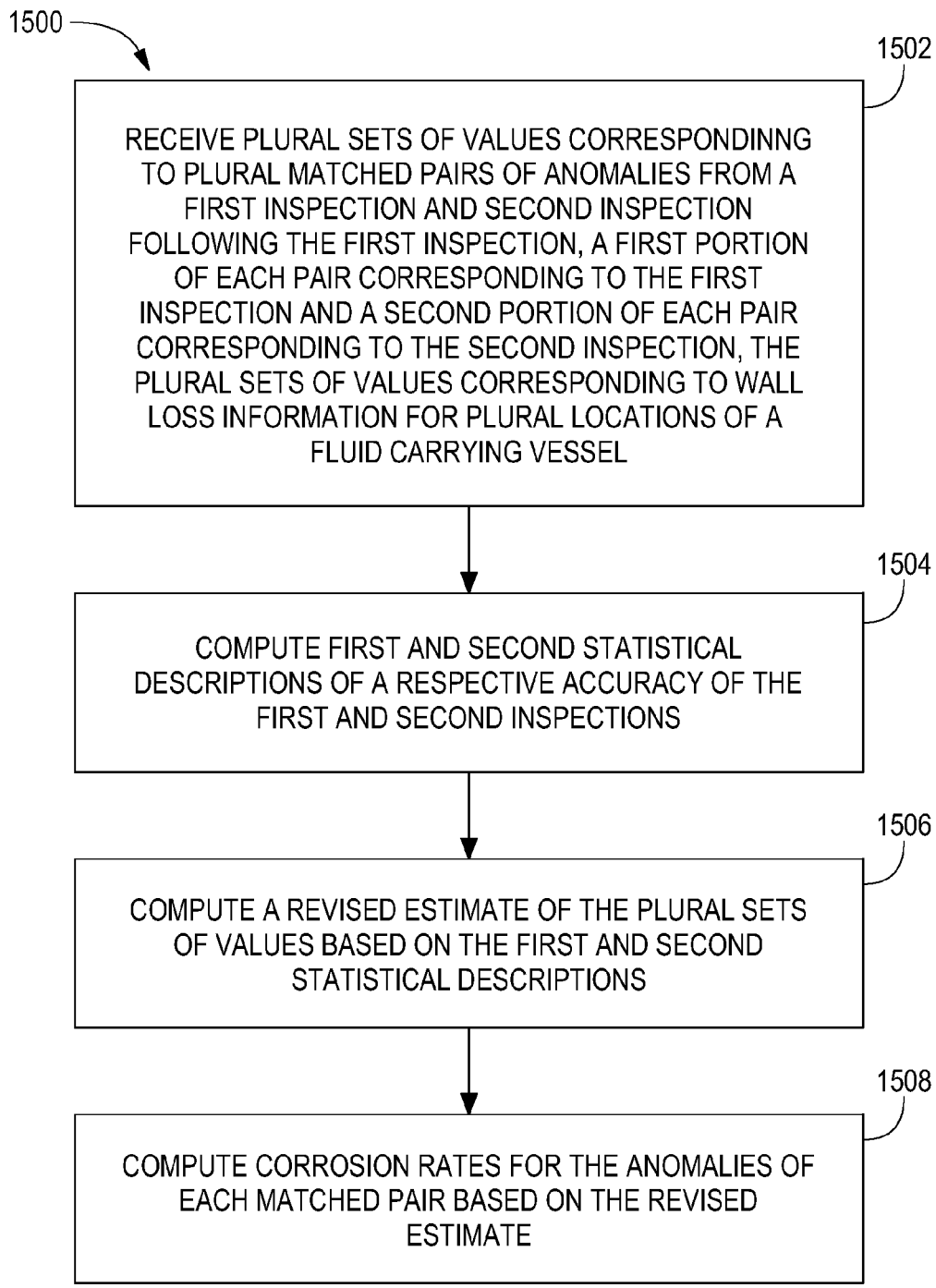

Another embodiment of a method 1500, shown in FIG. 15 and implemented by the computing device 300 (e.g., via the processor 302 executing one or more logic stored in memory 304) to account for sizing uncertainty includes receiving plural sets of values corresponding to plural matched pairs of anomalies from a first inspection and second inspection following the first inspection, a first portion of each pair corresponding to the first inspection and a second portion of each pair corresponding to the second inspection, the plural sets of values corresponding to wall loss information for plural locations of a fluid carrying vessel (1502), computing first and second statistical descriptions of a respective accuracy of the first and second inspections (1504), computing a revised estimate of the plural sets of values based on the first and second statistical descriptions (1506), and computing corrosion rates for the anomalies of each matched pair based on the revised estimate (1508).

Figure 16:
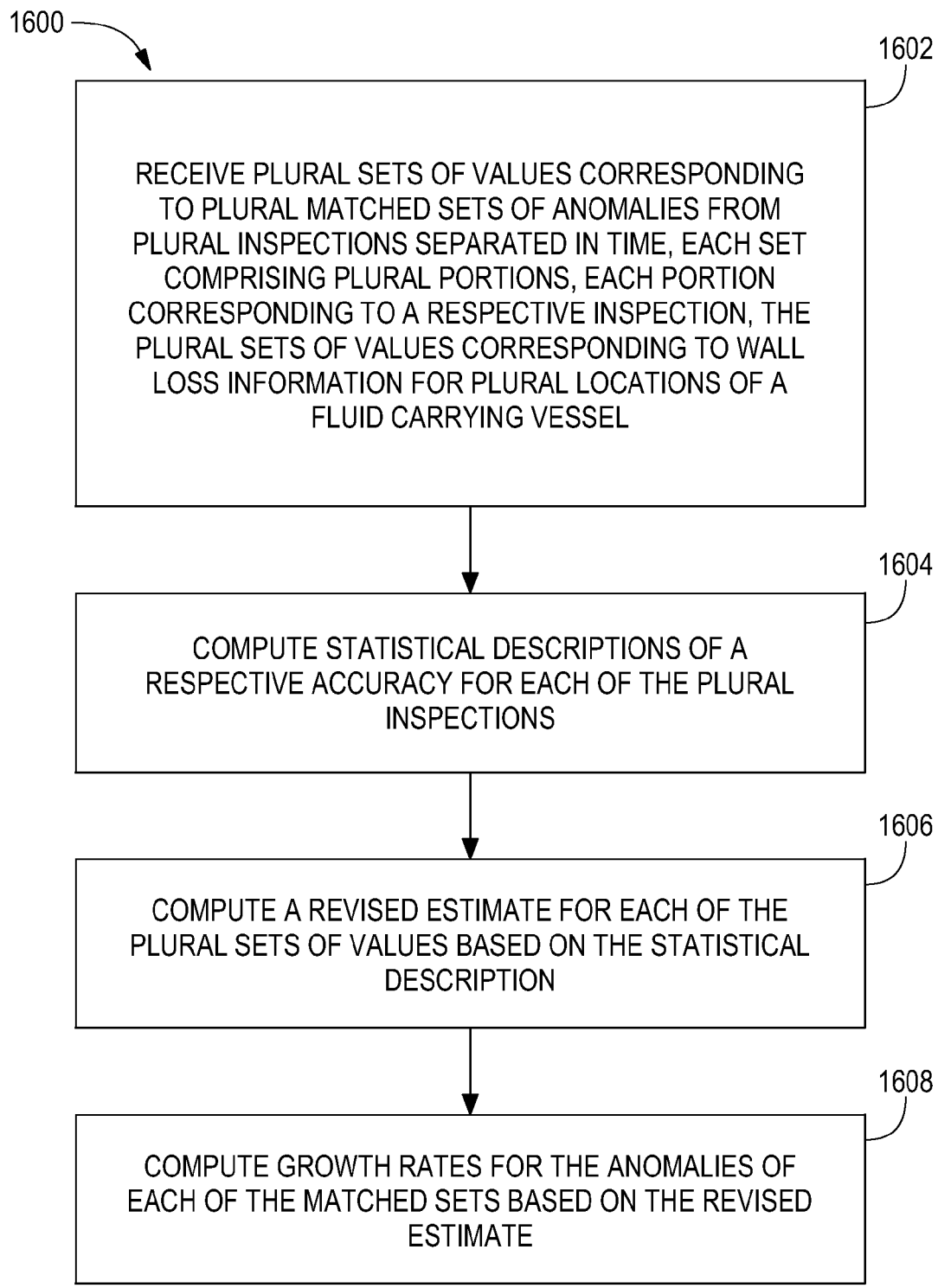

Another embodiment of a method 1600, shown in FIG. 16 and implemented by the computing device 300 (e.g., via the processor 302 executing one or more logic stored in memory 304) to account for sizing uncertainty includes receiving plural sets of values corresponding to plural matched sets of anomalies from plural inspections separated in time, each set comprising plural portions, each portion corresponding to a respective inspection, the plural sets of values corresponding to wall loss information for plural locations of a fluid carrying vessel (1602), computing statistical descriptions of a respective accuracy for each of the plural inspections (1604), computing a revised estimate for each of the plural sets of values based on the statistical descriptions (1606), and computing growth rates for the anomalies of each of the matched sets based on the revised estimate (1608).

Any software components illustrated herein are abstractions chosen to illustrate how functionality is partitioned among components in some embodiments of the IA systems disclosed herein. Other divisions of functionality are also possible, and these other possibilities are intended to be within the scope of this disclosure.

Any software components included herein are described in terms of code and data, rather than with reference to a particular hardware device executing that code. Furthermore, to the extent that systems and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow diagrams herein provide examples of the operation of the IA systems and methods. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The foregoing description of illustrated embodiments of the present disclosure, including what is described in the abstract, is not intended to be exhaustive or to limit the disclosure to the precise forms disclosed herein. While specific embodiments of, and examples for, the disclosure are described herein for illustrative purposes only, various equivalent modifications are possible within the spirit and scope of the present disclosure, as those skilled in the relevant art will recognize and appreciate. As indicated, these modifications may be made to the present disclosure in light of the foregoing description of illustrated embodiments.

Thus, while the present disclosure has been described herein with reference to particular embodiments thereof, a latitude of modification, various changes and substitutions are intended in the foregoing disclosures, and it will be appreciated that in some instances some features of embodiments of the disclosure will be employed without a corresponding use of other features without departing from the scope of the disclosure. Therefore, many modifications may be made to adapt a particular situation or material to the essential scope of the present disclosure. It is intended that the disclosure not be limited to the particular terms used in following claims and/or to the particular embodiment disclosed as the best mode contemplated for carrying out this disclosure, but that the disclosure will include any and all embodiments and equivalents falling within the scope of the appended claims.

At least the following is claimed:

1. A method, comprising:

receiving plural sets of values corresponding to plural matched pairs of anomalies from a first inspection and second inspection following the first inspection, a first portion of each pair corresponding to the first inspection and a second portion of each pair corresponding to the second inspection, the plural sets of values corresponding to wall loss information for plural locations of a fluid carrying vessel;

computing by a processor first and second statistical descriptions of a respective accuracy of the first and second inspections; and computing by the processor a revised estimate of the plural sets of values based on the first and second statistical descriptions;

further comprising computing by the processor growth rates for the anomalies of each matched pair based on the revised estimate.

2. The method of claim 1, wherein the computation of the growth rates is based on historical measured growth rates.

3. The method of claim 1, wherein the computation of the growth rates is based on historical measured anomaly sizes.

4. The method of claim 1, wherein the growth rate comprises a corrosion rate.

5. The method of claim 1, wherein the anomalies comprise a measured maximum wall thickness deterioration.

6. A system, comprising:
a memory with logic; and
a processor configured to execute the logic to:
receive plural sets of values corresponding to plural matched pairs of anomalies from a first inspection and second inspection following the first inspection, a first portion of each pair corresponding to the first inspection and a second portion of each pair corresponding to the second inspection, the plural sets of values corresponding to wall loss information for plural locations of a fluid carrying vessel;
compute first and second statistical descriptions of a respective accuracy of the first and second inspections;
compute a revised estimate of the plural sets of values based on the first and second statistical descriptions; and
compute corrosion rates for the anomalies of each matched pair based on the revised estimate.

7. The system of claim 6, wherein the computation of the corrosion rates is based on historical measured corrosion rates.

8. The system of claim 6, wherein the computation of the corrosion rates is based on historical measured anomaly sizes.

9. The system of claim 6, wherein the anomalies comprise a measured maximum wall thickness corrosion.

10. The system of claim 6, wherein the processor is further configured with the logic to identify the plural matched pairs of anomalies.

11. A non-transitory computer readable medium containing computer instructions stored therein for causing a computer processor to perform steps comprising:
receiving plural sets of values corresponding to plural matched sets of anomalies from plural inspections separated in time, each set comprising plural portions, each portion corresponding to a respective inspection, the plural sets of values corresponding to wall loss information for plural locations of a fluid carrying vessel;
computing statistical descriptions of a respective accuracy for each of the plural inspections;
computing a revised estimate for each of the plural sets of values based on the statistical descriptions; and
computing growth rates for the anomalies of each of the matched sets based on the revised estimate.

12. The non-transitory computer readable medium of claim 11, wherein the computation of the growth rates is based on historical measured corrosion rates.

13. The non-transitory computer readable medium of claim 11, wherein the computation of the growth rates is based on historical measured anomaly sizes.

14. The non-transitory computer readable medium of claim 11, wherein the anomalies comprise a measured maximum wall thickness growth.

15. The non-transitory computer readable medium of claim 11, wherein the processor is further configured with the software code to identify the anomalies of each set that match.

\* \* \* \* \*